United States Patent
Matsuda

(10) Patent No.: US 7,327,478 B2
(45) Date of Patent: Feb. 5, 2008

(54) IMAGE PROCESSING DEVICE, INFORMATION PROCESSING METHOD AND COMPUTER-READABLE STORAGE MEDIUM STORING A CONTROL PROGRAM FOR PERFORMING AN OPERATION BASED ON WHETHER A FUNCTION IS BEING SET OR REQUESTED TO BE SET

(75) Inventor: Hiroshi Matsuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 10/084,421

(22) Filed: Feb. 28, 2002

(65) Prior Publication Data
US 2002/0122203 A1 Sep. 5, 2002

(30) Foreign Application Priority Data
Mar. 2, 2001 (JP) .............................. 2001-058300
Feb. 14, 2002 (JP) .............................. 2002-036809

(51) Int. Cl.
*G06K 15/00* (2006.01)
(52) U.S. Cl. ................... 358/1.14; 358/1.13; 358/1.15; 399/80; 399/81
(58) Field of Classification Search ................ 713/155, 713/176; 358/1.14, 1.13, 1.15; 709/224; 399/80, 81
See application file for complete search history.

(56) References Cited

U.S. PATENT DOCUMENTS

| 5,220,674 | A | * | 6/1993 | Morgan et al. ............. 709/223 |
| 5,633,932 | A | * | 5/1997 | Davis et al. ................. 713/176 |
| 5,798,738 | A | | 8/1998 | Yamada .......................... 345/2 |
| 5,875,296 | A | | 2/1999 | Shi et al. ................ 395/188.01 |
| 5,999,766 | A | * | 12/1999 | Hisatomi et al. ............. 399/80 |
| 6,104,499 | A | | 8/2000 | Yamada ..................... 358/1.15 |
| 6,378,070 | B1 | * | 4/2002 | Chan et al. ................. 713/155 |
| 6,421,135 | B1 | * | 7/2002 | Fresk et al. ................ 358/1.15 |
| 6,757,741 | B1 | * | 6/2004 | Hertling ..................... 709/245 |

FOREIGN PATENT DOCUMENTS

| JP | 8-329005 | 12/1996 |
| JP | 10-191010 | 7/1998 |
| JP | 10-257048 | 9/1998 |
| JP | 2000-112692 | 4/2000 |

\* cited by examiner

*Primary Examiner*—Aung S. Moe
*Assistant Examiner*—Vincent Rudolph
(74) *Attorney, Agent, or Firm*—Fitzpatrick, Cella, Harper & Scinto

(57) ABSTRACT

For example, an image processing device which can be operated from both remote user interface such as a Web browser and local interface by an operation panel or a card reader, and a computer system communicating with the device are embodied. A system of integrating authenticating processes by each of the remote and local user interfaces can be provided. In this case, an adjustment is made not to cause inconsistency by the conflict between the operation from the remote user interface and the operation from the local user interface so as to practically utilize each user interface.

44 Claims, 16 Drawing Sheets

IMAGE PROCESSING DEVICE, INFORMATION PROCESSING METHOD AND COMPUTER-READABLE STORAGE MEDIUM STORING A CONTROL PROGRAM FOR PERFORMING AN OPERATION BASED ON WHETHER A FUNCTION IS BEING SET OR REQUESTED TO BE SET

BACKGROUND OF THE INVENTION

1. Field of the Invention

The present invention relates to an image output system in which an image output device and a host computer are connected through a transmission medium such as a network, etc.

2. Related Background Art

Conventionally, a Web server is implemented in a copying machine, a printer, a facsimile, and an image output device (or also referred to as an image forming device) including a combination of the above mentioned devices, an HTTP (Hyper Text Transfer Protocol) protocol is used as a communications rule between the image output device and the host computer, and a user can view information such as the state information, the configuration information about the image output device, the status information and the history information about the image output job input into the image output device, etc. in the image output device through the Web browser in the host computer by transmitting the HTML document (document data described in the HTML).

The Web browser for interpreting the HTML document transferred by the HTTP protocol and displaying the contents described in the HTML has been widely implemented in a large number of different types of host computers, and enables various system to be configured regardless of the type of host computer. The HTTP protocol is a one-to-many multi-client protocol, and provides an opportunity in which a plurality of users can simultaneously interact with a device.

On the other hand, it is well known that the image output device includes division management means for discriminating a division code and a user code stored in a card using the function of a card reader device, allowing a user to operate the image output device, outputting an image, and storing the number of output images as associated with the discriminated division code and the user code, thereby managing the use of the image output device and the number of output images using a card for each division or user.

If division management means through local user interface for a card, an operation panel, etc. is applied in the remote operation of using a remote user interface (remote UI) such as an HTTP protocol, a Web browser, etc., then there can be the possibility that an operator who operates a local user interface (local UI) and an operator who performs a remote operation using a remote user interface belong to different divisions, thereby causing a loophole in management. Furthermore, when an operator is performing a remote operation, it is necessary to insert a card by going all the way to the image output device even in the remote operation, thereby causing the problem of losing the convenience in remote operation.

In addition, with the image processing device including a remote UI and a local UI, if one user interface is operated while the other user interface is being operated, then there can be the problem that each user cannot correctly grasp the information actually set in a copying machine. For example, if an input from the local UI operated by another user is set immediately after transmitting set information from the remote UI, then there is the possibility that the operator of the remote UI is not aware of the information about the setting from the local UI.

SUMMARY OF THE INVENTION

The present invention has been developed to solve at least one of the above mentioned problems, and aims at transmitting a division identifier and a password from a Web browser and allowing the image output device to authenticate them, and providing a system of managing the operability in the remote operation and the number of output images in the remote operation, and continuously integrating the operability in the remote operation using a card of the image output device and the number of output images.

Furthermore, it also aims at providing a system for, when one of the local user interface and the remote user interface is operating, limiting the operation of the other to avoid the inconsistency in the settings in the operation of the image processing device.

To attain at least one of the above mentioned objects, according to an embodiment of the present invention, for example, an image processing device which can be connected to an information processing device includes: first authentication input means for inputting authentication information from the information processing device for authenticating a request from the information processing device; second authentication input means for inputting authentication information input from an operation unit or a card reader of the image processing device; authentication processing means for authenticating data according to the authentication information input through the first authentication input means or the second authentication input means and the authentication information in the image processing device; and display information transmission means for presenting information about the image processing device and transmitting display information describing the contents of the image for operation of the image processing device from the image processing device to the information processing device if the request from the information processing device is authenticated based on the authentication result from the authentication processing means. If the operation by the operation unit or the request from the information processing device does not contend with the operation processed in the image processing device, then the operation in the operation unit or the request from the information processing device is accepted based on the authentication result from the authentication processing means.

Other features and advantages of the present invention will be apparent from the following description taken in conjunction with the accompanying drawings, in which like reference characters designate the same or similar parts throughout thereof.

DETAILED DESCRIPTION OF THE PREFERRED EMBODIMENTS

Figure 1:
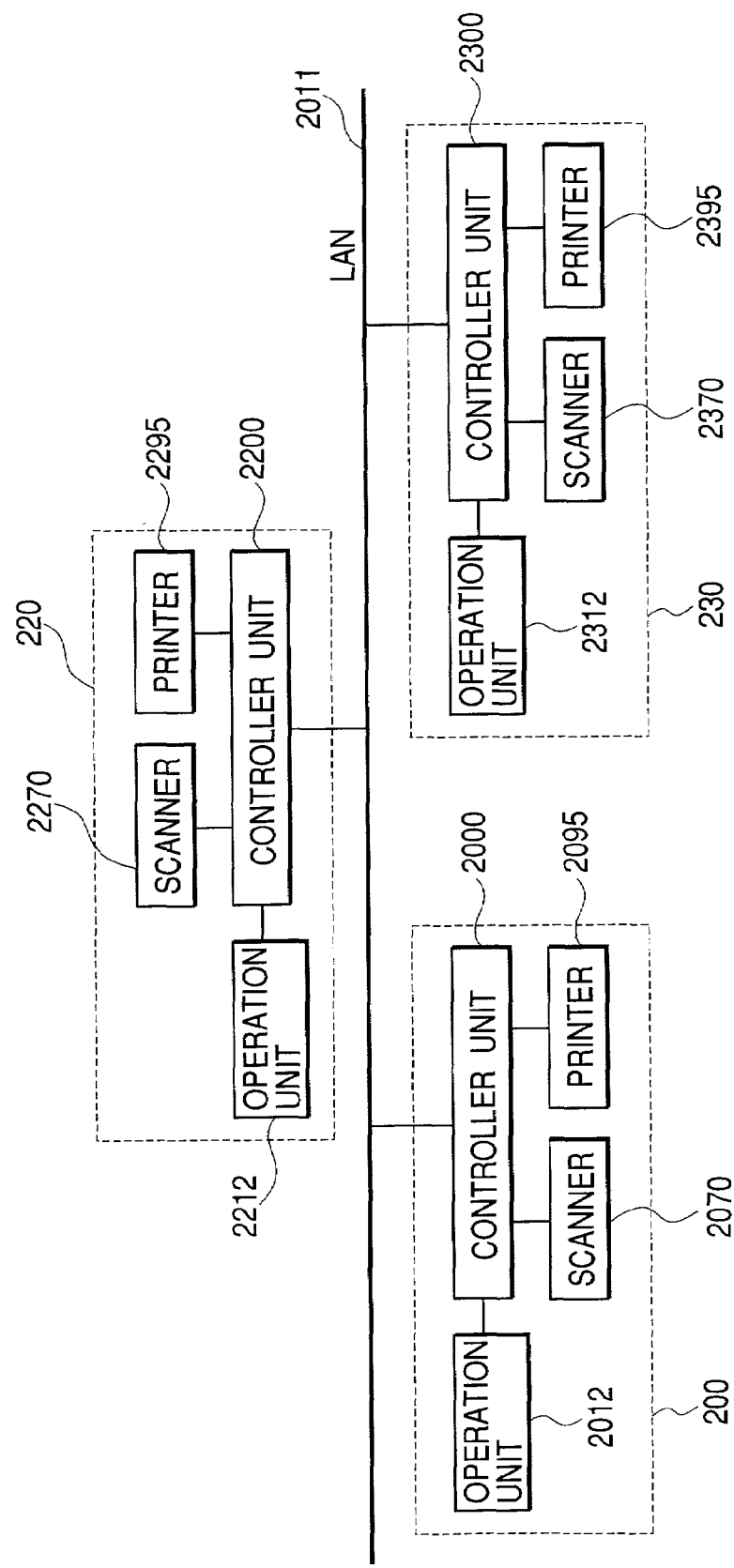
FIG. 1 shows the entire configuration of the image processing system.

An embodiment of the present invention is described below by referring to the attached drawings. FIG. 1 is a block diagram of the entire configuration of the image processing system according to the present invention. An image processing device 200 (including an image forming device) comprises a scanner unit 2070 which is an image input device, a printer unit 2095 which is an image output device, an operation unit 2012 which is a user interface, and a controller unit 2000 for controlling the scanner unit 2070, the printer unit 2095, and the operation unit 2012. The scanner unit 2070, the printer unit 2095, and the operation unit 2012 are connected to the controller unit 2000, and the controller unit 2000 is connected to network transmission means such as a LAN 2011, etc. To the LAN 2011, other image processing devices 220 and 230 having the same equipment configuration as the image processing device 200 are connected. The image processing device 220 comprises a scanner unit 2270, a printer unit 2295, and an operation unit 2212, and they are connected to a controller unit 2200. The image processing device 230 also comprises a scanner unit 2370, a printer unit 2395, and an operation unit 2312, and they are connected to a controller unit 2300. The image processing device includes a controller of a printer and a copying machine, and the image forming device includes a printing device. The image processing device includes a printer, a copying machine, a facsimile, and a combination of them.

Figure 2:
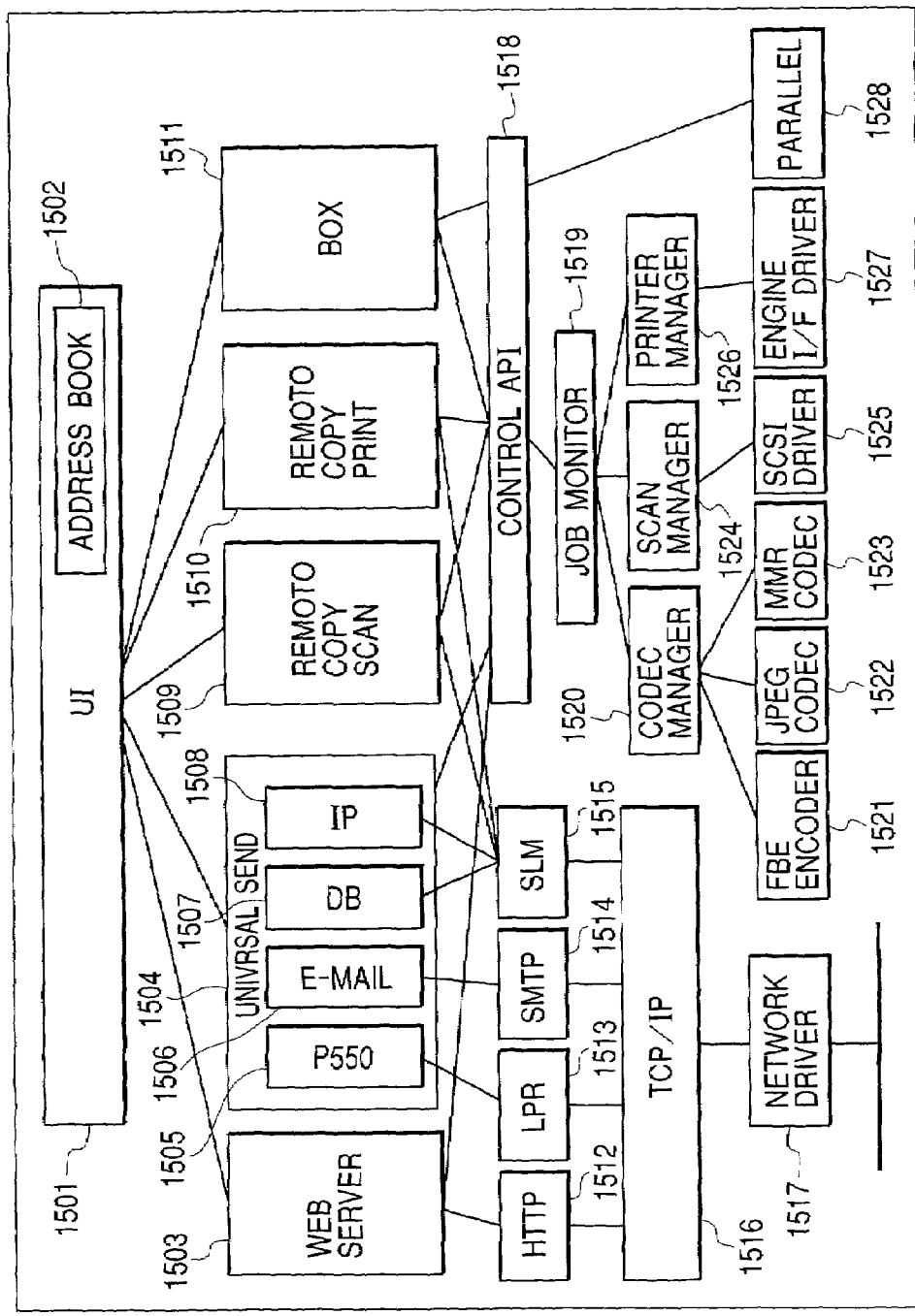
FIG. 2 shows the configuration of the function of the image processing device through software.

FIG. 2 is a block diagram of the configuration of the function of the image processing device through software. A UI module 1501 operates an user interface, and functions as an interface with equipment when an operator performs various operations and settings for the image processing device according to the present invention. The module transfers input information to various modules described later according to the operation of the operator, requests a process, sets data, etc.

An address-book module 1502 is a database module for managing the destination, the correspondent, etc. of data. The contents of an address book is used by the address-book module 1502 as data transfer and communications information for each module described later by the operation of an operator after the UI module 1501 adds, deletes, and obtains data.

A Web-Server module 1503 informs of the management information about the image processing device at a request of a Web client not shown in the attached drawings. The management information is read through a Universal-Send module 1504, a Remote-Copy-Print module 1510, a Remote-Copy-Scan module 1509, and a Control-API module 1518, all of which are described later, and the Web client is notified of the information through an HTTP module 1512, a TCP/IP module 1516, and a Network-Driver module 1517.

The Universal-Send module 1504 manages the distribution of data, and distributes the data specified by the UI module 1501 to the operator to a specified correspondent (destination). If the operator specifies the generation of distribution data using the scanner function of the equipment, then the equipment is operated through the Control-API module 1518 described later, thereby generating data. A Printer module 1505 is executed when a printer is specified as a destination in the Universal-Send module 1504. A module 1506 is executed when an E-mail address is specified as a database is specified as a destination in the Universal-Send module 1504. A module 1507 is executed when a database is specified as a destination in the Universal-Send module 1504. A module 1508 is executed when an image processing device similar to the equipment according to the present invention is specified as a destination in the Universal-Send module 1504.

A Remote-Copy-Scan module 1509 performs the same process as the Copy function realized solely by the image processing device using the scanner function of the image processing device according to the present invention, and using another image processing device connected through a network, etc. as a destination. That is, the image data read by the scanner function of the image forming device according to the present invention is transferred to another image processing device, and the image based on the image data is printed by the printing function of the image processing device.

The Remote-Copy-Print module 1510 uses the printer function of the image processing device according to the present invention, and performs the same process as the Copy function solely realized by the image processing device according to the present invention using another image processing device connected through a network, etc. as a source. That is, it receives image data read by the scanner function of another image processing device, and prints the image based on the image data using the printer function of the image processing device according to the present invention.

A BOX module 1511 stores scan image data or PDL print image data in the HDD, prints the stored image by the printer function, and transmits it using the Universal-Send module function. Furthermore, it provides the function of managing the document data (including the above mentioned scan image data and PDL print image data) stored in the HDD by deleting, grouping (storing in an individual box), transferring among boxes, copying among boxes, etc.

The HTTP module 1512 is used when the image processing device according to the present invention communicates with an external device through the HTTP, and provides a communication function for the above mentioned Web-Server module 1503 in cooperation with the TCP/IP module 1516 described later.

An Lpr module 1513 provides a communications function for the Printer module 1505 in the above mentioned Universal-Send module 1504 in cooperation with the TCP/IP module 1516 described later.

A SMTP module 1514 provides a communications function for the E-mail module 1506 in the above mentioned Universal-Send module 1504 in cooperation with the TCP/IP module 1516 described later.

An SLM (Salutation-Manager) module 1515 provides a communications function for the database module 1517 and the DP module 1518 in the above mentioned Universal-Send module 1504, and the Remote-Copy-Scan module 1509, and the Remote-Copy-Print module 1510 in cooperation with the TCP/IP module 1516 described later.

The TCP/IP module 1516 provides a network communications function using a TCP/IP protocol for the above mentioned various modules in cooperation with the Network-Driver module 1517 described later.

The Network-Driver module 1517 controls a portion physically connected to a network. The Control-API module 1518 provides an interface with a lower module such as a Job-Monitor module 1519, etc. described later for a higher module such as the Universal-Send module 1504, etc., thereby reducing the dependency between a higher module and a lower module to enhance the diverseness of each module.

The Job-Monitor module 1519 interprets the process specified by each of the above mentioned modules through the Control-API module 1518, and issues an instruction to each module described later. This module centrally manages a hardware process performed in the image processing device according to the present invention.

A CODEC-Manager module 1520 manages and controls the compression and decompression of data in the processes specified by the Job-Monitor module 1519. An FBE-Encoder module 1521 compresses the data read in the scanning process performed by the Job-Monitor module 1519 and a Scan-Manager module 1524 in an FBE format. A JPEG-CODE module 1522 performs a JPEG compressing process on the read data and a JPEG expanding process on print data in the scanning process performed by the Job-Monitor module 1519 and the Scan-Manager module 1524 and the printing process performed by a Printer-Manager module 1526. An MMR-CODEC module 1523 performs an MMR compressing process on read data and an MMR expanding process on print data in the scanning process performed by the Job-Monitor module 1519 and the Scan-Manager module 1524 and the printing process performed by a Printer-Manager module 1526.

The Scan-Manager module 1524 manages and controls the scanning process specified by the Job-Monitor module 1519. An SCSI driver module 1525 establishes communications between the Scan-Manager module 1524 and the scanner unit internally connected to the image processing device according to the present invention. The Printer-Manager module 1526 manages and controls the printing process specified by the Job-Monitor module 1519. An Engine-I/F driver module 1527 provides an I/F between the Printer-Manager module 1526 and the printing unit. A Parallel-Port-Driver module 1528 provides an I/F when a Web-Pull-Print module 1511 outputs data to an output equipment not shown in the attached drawings through a parallel port.

Figure 3:
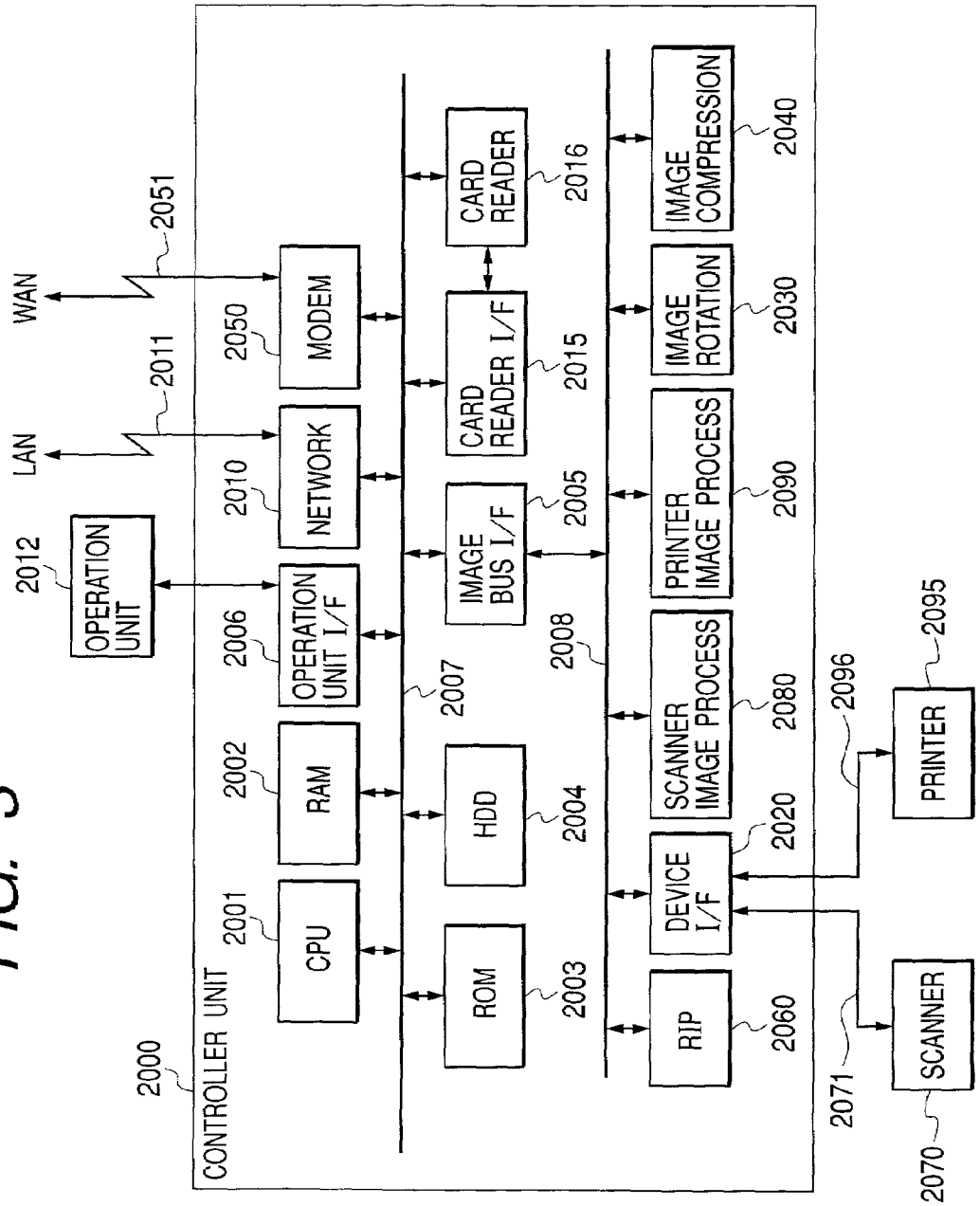
FIG. 3 is a block diagram of the control configuration of the image processing device.

FIG. 3 is a block diagram of the configuration of the control of the image processing device. The controller unit 2000 is connected to the scanner unit 2070 which is an image input device and the printer unit 2095 which is an image output device, and is also connected to the LAN 2011 and a public line (WAN) 2051, thereby inputting and outputting image information and device information.

A CPU 2001 is a controller for controlling the entire system. A RAM 2002 is system work memory for the operation of the CPU 2001, and is also image memory for temporarily storing image data. ROM 2003 is boot ROM and stores a boot program of the system. An HDD 2004 is a hard disk drive, and stores system software and image data.

An operation unit I/F 2006 is an interface unit with the operation unit (UI) 2012, and outputs image data to be displayed on the operation unit 2012 to the operation unit 2012. In addition, it transmits to the CPU 2001 the information input by a system user from the operation unit 2012. A network I/F 2010 is connected to the LAN 2011 and inputs and outputs information. A modem I/F 2050 is connected to the public line 2051, and inputs and outputs information. The above mentioned devices are arranged through a system bus 2007.

An image bus I/F 2005 is a bus bridge for connecting the system bus 2007 with an image bus 2008 for transferring image data at a high speed, and converting a data structure. The image bus 2008 is configured by a PCI bus or an IEEE 1394.

The following devices are arranged through the image bus 2008. A raster image processor (RIP) 2060 expands a PDL code into a bit map image. A device I/F unit 2020 connects the scanner unit 2070 and the printer unit 2095 which are image input and output devices with the controller unit 2000, and performs a synchronous/asynchronous system conversion.

A scanner image processing unit 2080 amends, processes, and edits input image data. A printer image processing unit performs a printer amending process, a solution converting process, etc. on print output image data. An image rotation unit 2030 rotates image data. An image compression unit 2040 performs a JPEG compressing/decompressing process on multivalue image data, and a JBIG, MMR, and MH compressing/decompressing process on binary image data. A card reader I/F 2015 is an interface unit of a card reader 2016 which is a magnetic card reader.

Figure 4:
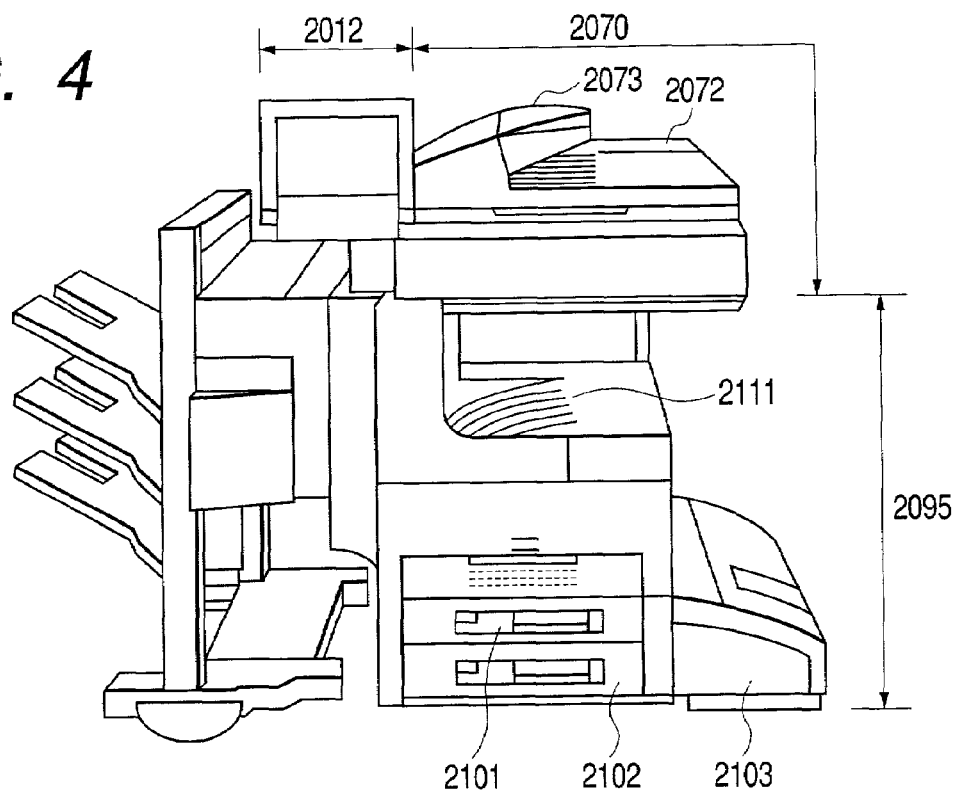
FIG. 4 shows the appearance of the image processing device.

FIG. 4 shows the appearance of the image processing device. The scanner unit 2070 which is an image input device lights an image on the paper which is a draft, and a CCD line sensor (not shown in the attached drawings) is operated, thereby converting the image into electric signals as raster image data. A sheet of draft paper is set on a tray 2073 of a draft feeder 2072, a device user issues a read start instruction from the operation unit 2012, thereby issuing an instruction from the CPU 2001 to the scanner unit 2070, and performing a draft image reading operation by the draft feeder 2072 feeding the draft paper one by one.

The printer unit 2095 which is an image output device converts a raster image data 2096 into an image on paper, and the system can be an electronic photographing system using a photosensitive drum and a photosensitive belt, an ink jet system in which an image is directly printed on paper by spraying ink from a fine nozzle array, etc. Any optional system can be applied. The activation of a printing operation is started by an instruction 2096 from the controller CPU

2001. The printer unit 2095 is provided with a plurality of paper feed stage such that different paper sizes or different paper directions can be selected, and there can be corresponding paper cassettes 2101, 2102, and 2103. An output tray 2111 receives a printed paper.

Figure 5:
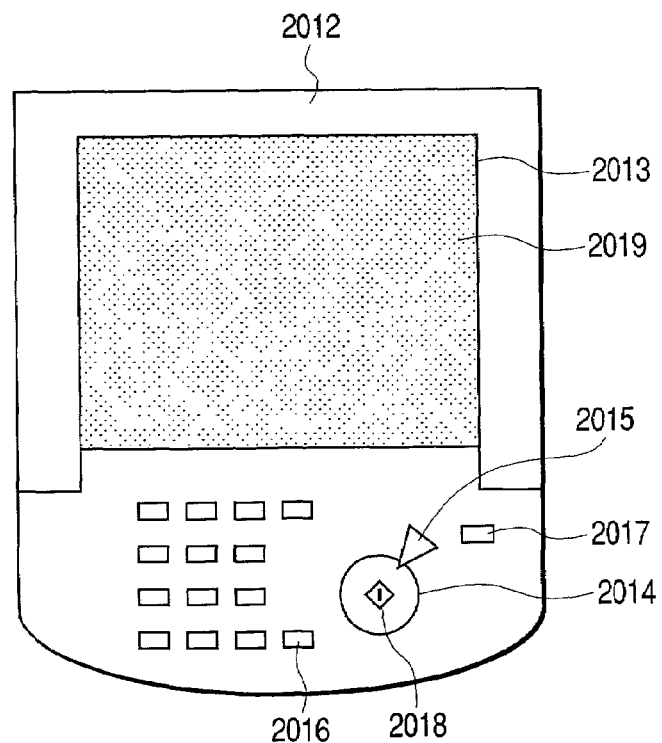
FIG. 5 shows the configuration of the operation unit.

FIG. 5 shows the configuration of the operation unit 2012. An LCD display unit 2013 has a touch panel sheet 2019 attached on the LCD, displays an operation screen of the system and a soft key, and transmits to the CPU 2001 the position information about a displayed key if the key is depressed. A start key 2014 is used when, for example, an operation of reading a draft image is started, etc. There are two color LEDs 2018 of green and red at the center of the start key 2014. They indicate depending on the colors whether or not the start key 2014 is in an available state. A stop key 2015 stops the operation. An ID key 2016 is used when a user ID of a user is input. A reset key 2017 is used when settings from the operation unit are initialized.

Figure 6:
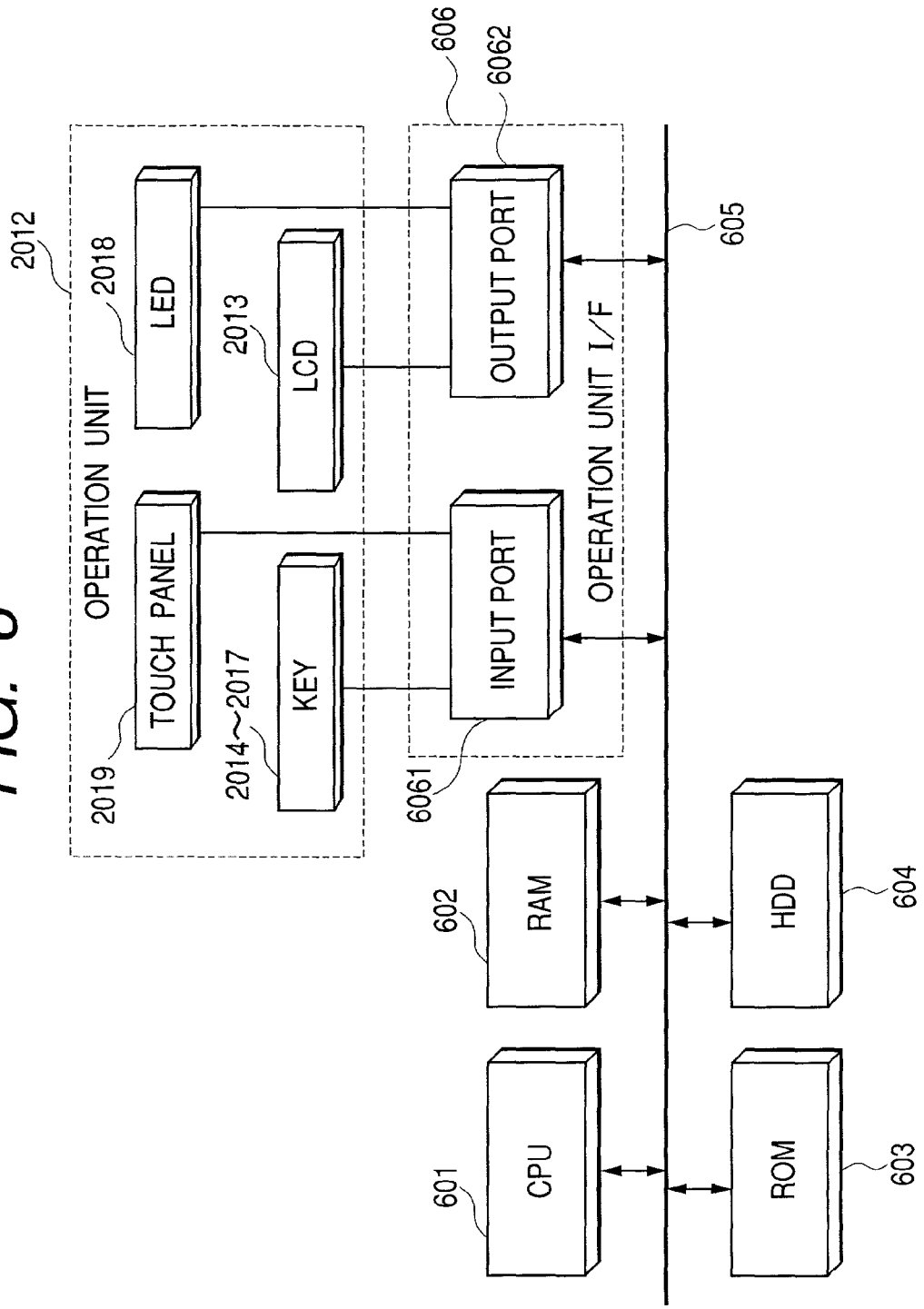
FIG. 6 is a block diagram of the control configuration of the operation unit of the image processing device.

FIG. 6 is a block diagram of the configuration of the control of the operation unit of the image processing device. A control CPU 601 generally controls access of each device connected to a system bus 605 according to the control program, etc. stored in the program ROM 603 and a HDD 604. RAM 602 functions as main memory, a work area, etc. of the control CPU 601. The control CPU 601 receives a user input from the touch panel 2019 and the hard keys 2014 to 2017, and obtains the contents of an operation through an input port 6061 of the operation unit I/F. Based on the obtained operation contents and the above mentioned program, the control CPU 601 generates display screen data, and outputs the display screen data to the screen output devices 2013 and 2018 such as an LCD and a CRT through an output port 6062 of the operation unit I/F for controlling the screen output device.

Described below is the remote UI (remote user interface) which is a characteristic function according to the present invention. The remote UI has the function of obtaining from an external unit to the device and setting the information such as the state, etc. of a device, and performing an operation such as a printing process, a transmitting process (Universal-Send module), etc. The user can use the function of the remote UI by accessing the device using a Web browser from the host computer such as a personal computer, etc. connected to a network.

As shown in FIG. 2, the Web-Server module 1503 is operating inside the device, thereby allowing the image processing device to establish communications through the HTTP (HyperTextTransferProtocol). In the Web-Server module 1503, a CGI (CommonGatewayInterface) program activated at a request from the client can be executed.

In the HDD 2004 shown in FIG. 3, a resource file group, a page template file group are stored. They are used by the remote UI. A resource file can be an HTML (HyperText-MarkupLanguage) file for use in a page display, an image file, etc. A template file is referred from the CGI program, and is used in generating a page.

To access the device, the user either inputs a URL (UniformResourceLocator) directly into the Web browser or selects a link into which the URL is embedded. The URL is not limited to this application. That is, it can be a network address, a device ID, etc. so far as it is identification information for designation of an image processing device.

A Web browser transmits through a communications route a HTTP command specifying the URL input by the operator. The Web-Server module 1503 receives the HTTP command, analyzes the HTTP command, and performs a corresponding operation. If a request from a client browser is not a request to activate a CGI program, then the resources specified in the above mentioned resource groups are transmitted to the client browser, thereby terminating the process. If the request from the client browser is a CGI program, then a corresponding CGI program is activated.

The CGI program can receive a query parameter when it is activated, and receives a value specified by the user through the browser. The CGI program requests the body to obtain and set device information at the request, and also to perform a print-out process, etc. In addition, the CGI program generates a page to be transmitted using a template file corresponding to the page. A template file includes a portion containing a description to be changed according to the obtained information, thereby generating a HTML document indicating the contents of the page corresponding the state of the image processing device at that point in time.

The Web browser on the source side indicates a page to the user based on the HTML document returned from the device. Thus, by accessing the device using the Web browser, the function, state, and storage information about the device can be obtained and set using the remote UI, and the device can be operated from a remote place of the image processing device. The information obtained and set by the remote UI are, for example, device information such as an available paper size, the remaining volume, etc., input job information, document information accumulated in the storage device, address information about E-mail, FAX, etc., setting information about a network, etc.

Figure 7:
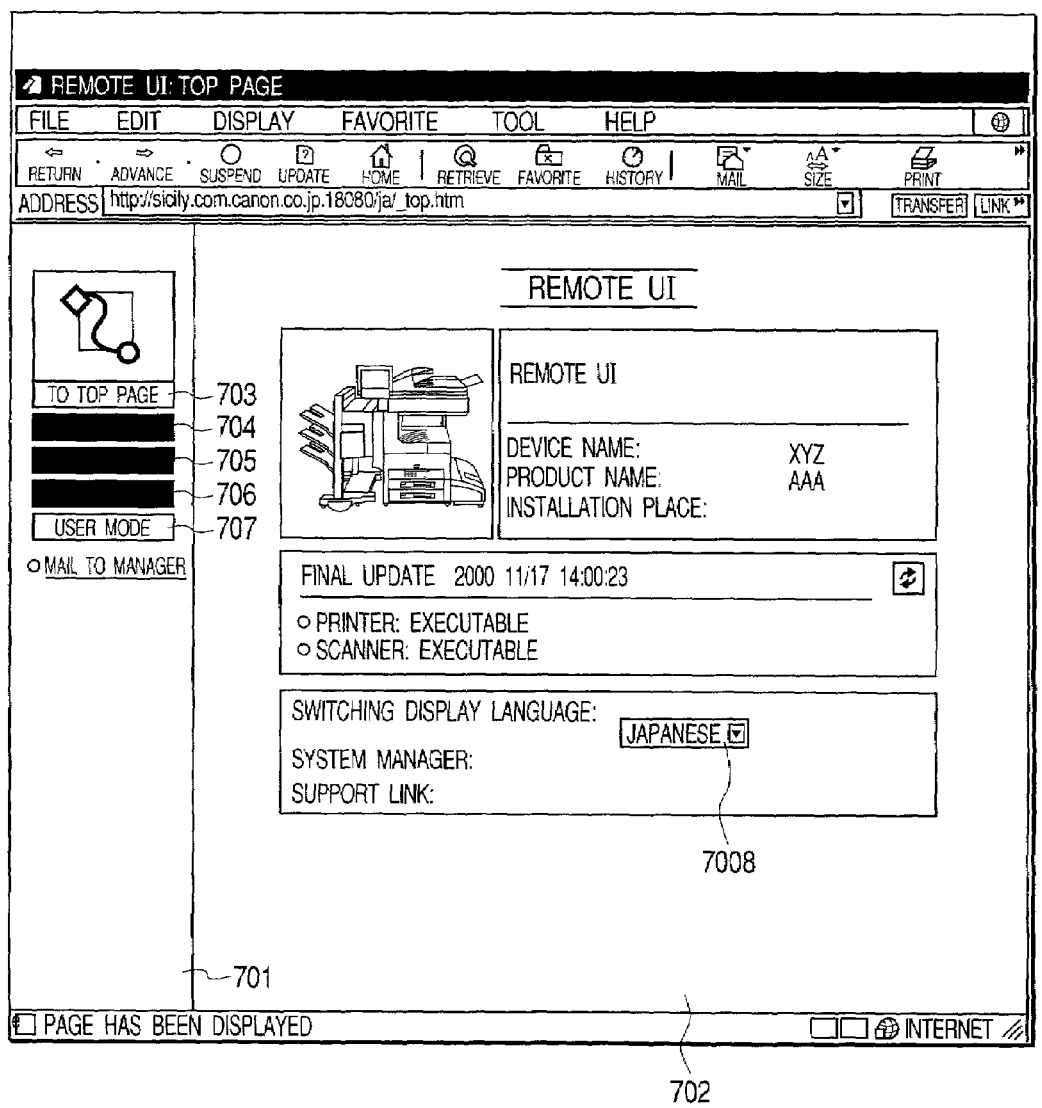
FIG. 7 shows an example of the Web browser displaying the screen based on the HTML document.

The above mentioned information is included in the HTML document, and the Web browser analyzes the HTML document, and displays a graphical screen indicating the information. In addition, as an operation which can be performed by the remote UI can be printing and transmitting document information held in the equipment, etc. FIG. 7 shows an example of a screen displayed by the Web browser based on the HTML document.

Figure 8:
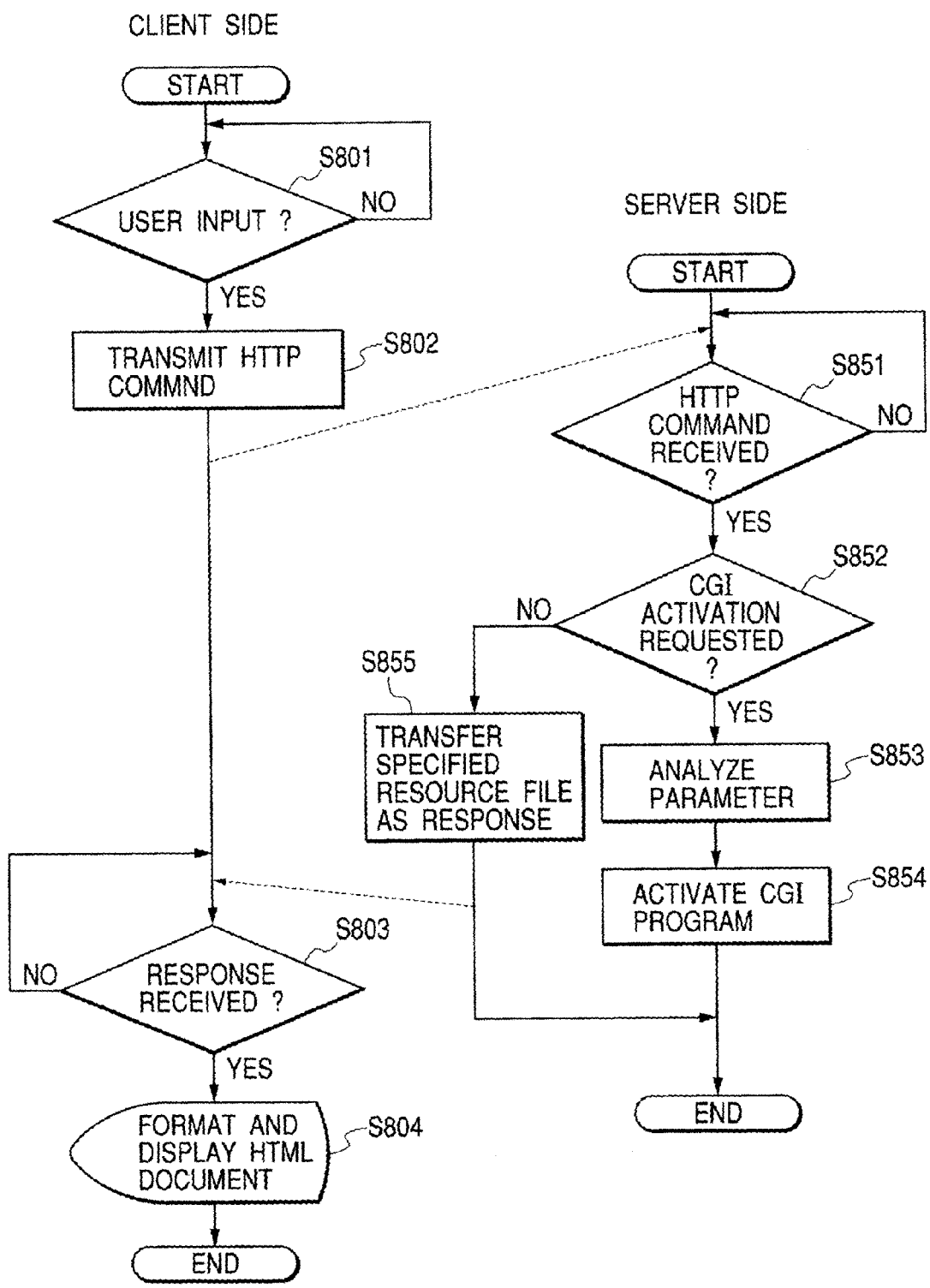
FIG. 8 is a flowchart of the basic process on the client (Web browser) part and the server (image processing device) part.

FIG. 8 is a flowchart of the basic process on the client (Web browser) side and the server (image processing device) side. On the client side, an input of the URL by a user is awaited in step S801. In step S802 after the URL is input, the HTTP command indicating the URL is transmitted. In step S803, the reception of a response is awaited. After receipt of a response, the HTML document transferred from the server side is correctly formed and displayed in step S804, thereby terminating one session.

On the other hand, first in step S851, the reception of a HTTP command is awaited. Upon receipt of the command, it is determined in step S852 whether or not it is a request to activate the CGI. If it is a request to activate the CGI, then the CGI parameter is analyzed in step S853, and a CGI program is activated in step S804 based on the analysis result, thereby terminating one session.

If it is not a request to activate the CGI in step S802, a resource file specified is returned as a response, thereby terminating one session.

On many pages, since the display contents change depending on the situation at the point in time, equipment information is obtained from an activated CGI program, an HTML is generated from a template file, and the file is returned as a response. That is, the equipment information is obtained by detecting the state of equipment, by referring to a set value set in the equipment, etc., and the obtained equipment information is embedded in the template file to generate an HTML document. The document is returned as a response. In step S805, the HTML file is not processed, and the specified HTML file is returned as is.

FIG. 7 shows an example of the screen configured based on the generated HTML document. The screen is configured by two frames, that is, an index area 701 and a main area 702. In the index area, a main site map is displayed. A corresponding screen is displayed in the main area if a button on the map is pressed. FIG. 7 is the top page of the remote UI, and is a default page displayed when only the IP address of the device is input as a URL in the Web browser. The top page displays the general information about the equipment. Furthermore, a device information page, a job status page, a box page, a user mode page, etc. are displayed when the buttons (a device button 704, a job status button 705, a box button 706, and a user mode button 707) arranged in the index area are pressed. When a return-to-top-page button 703 is pressed, the top page is displayed. A display language switch pull-down menu 708 is used for selection of a display language, and the language switch pull-down menu is displayed by pressing it. If a language is selected on the pull-down menu, the top page of the selected language is displayed.

Figure 9:
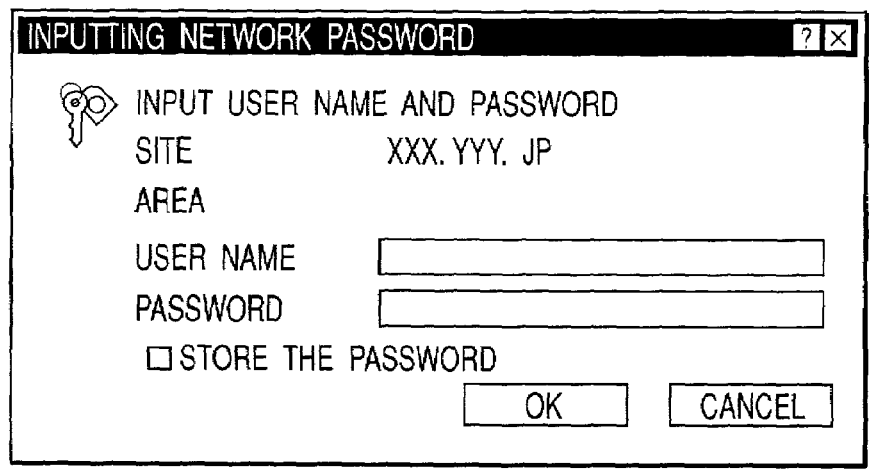
FIG. 9 shows the dialog box for input of a division ID and a password.

Described below is the authenticating operation in the remote UI. On the top page, when the user mode button 707 or the box button 706 is pressed, the input dialog box of a division ID and a password is displayed as shown in FIG. 9. If the user inputs a division ID and a password in the dialog box, and is authenticated, then a user mode page (not shown in the attached drawings) or a box page (not shown in the attached drawings) is displayed. If the user cannot be authenticated, then an authentication error page (not shown in the attached drawings) is displayed.

Figure 10:
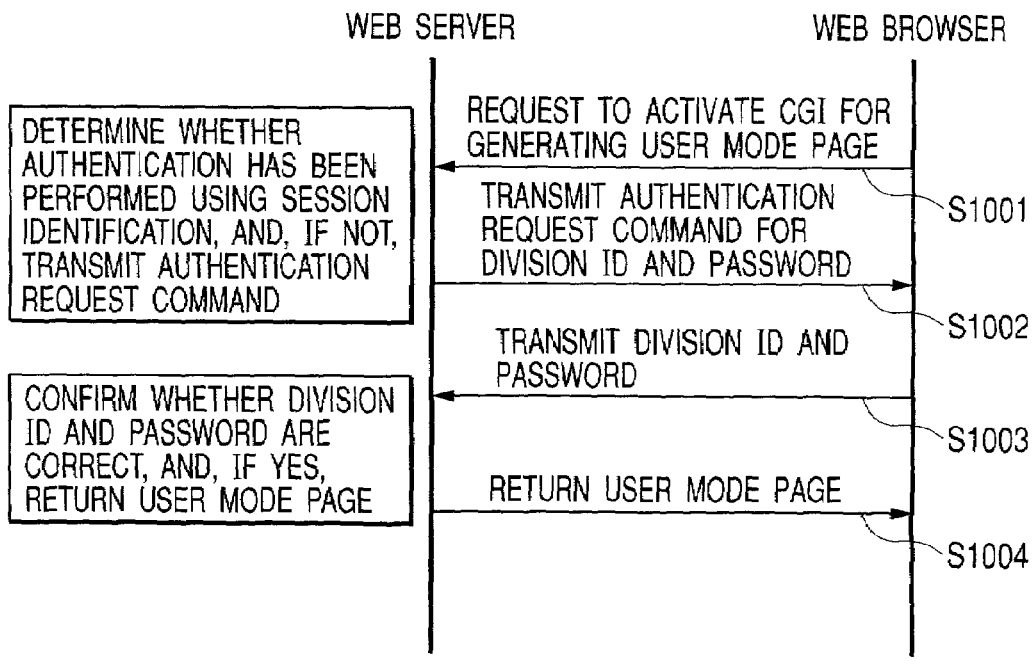
FIG. 10 is a flowchart of the authentication sequence used when the user mode button is pressed.

An example of an authentication sequence (successful example) when the user mode button 707 is pressed is described by referring to the sequence chart shown in FIG. 10. First, the user mode button 707 is pressed in the Web browser, an activation request command of the CGI program for generating a user mode page is transmitted to the Web server (Web-Server module 1503) on the image processing device side (S1001).

The command is accompanied with a session ID for identification of a connection browser. When the Web browser is first connected to this Web server after activating the Web browser, a new session ID is issued, and is transmitted to the Web browser by the cookie function. Thereafter, the Web browser stores and manages the session ID, and adds the session ID to a command when the command is transmitted to the Web server (refer to the RFC2109, RFC2964, RFC2965, etc. of RFC=RequestForComments issued by IETF=TheInternetEnginneringTaskForce, etc.).

The Web server which receives an activation request of the CGI determines in S1002 whether or not the session ID has been authenticated. If not, it transmits an authentication request command for the division ID and the password (S1002). If the session ID has been authenticated, then it is assumed that an authenticating process has been completed on the division ID and the password, and the authenticating process is not newly performed.

If the input dialog box for the division ID and the password shown in FIG. 9 is displayed in the Web browser, the operator inputs the division ID and the password, and presses the OK button, then the division ID and the password are transmitted to the Web server (S1004). The input dialog box can be provided by the Web browser or the OS (OperatingSystem) for execution of the Web browser in response to the authentication request command of the Web server, or can be displayed by the Web browser based on the HTML document indicating the input dialog box transmitted with the authentication request command from the Web server.

Finally, the Web server determines whether or not the division ID and the password are correct. If they are correct, then a user mode page is generated and returned (S1004).

Figure 11:
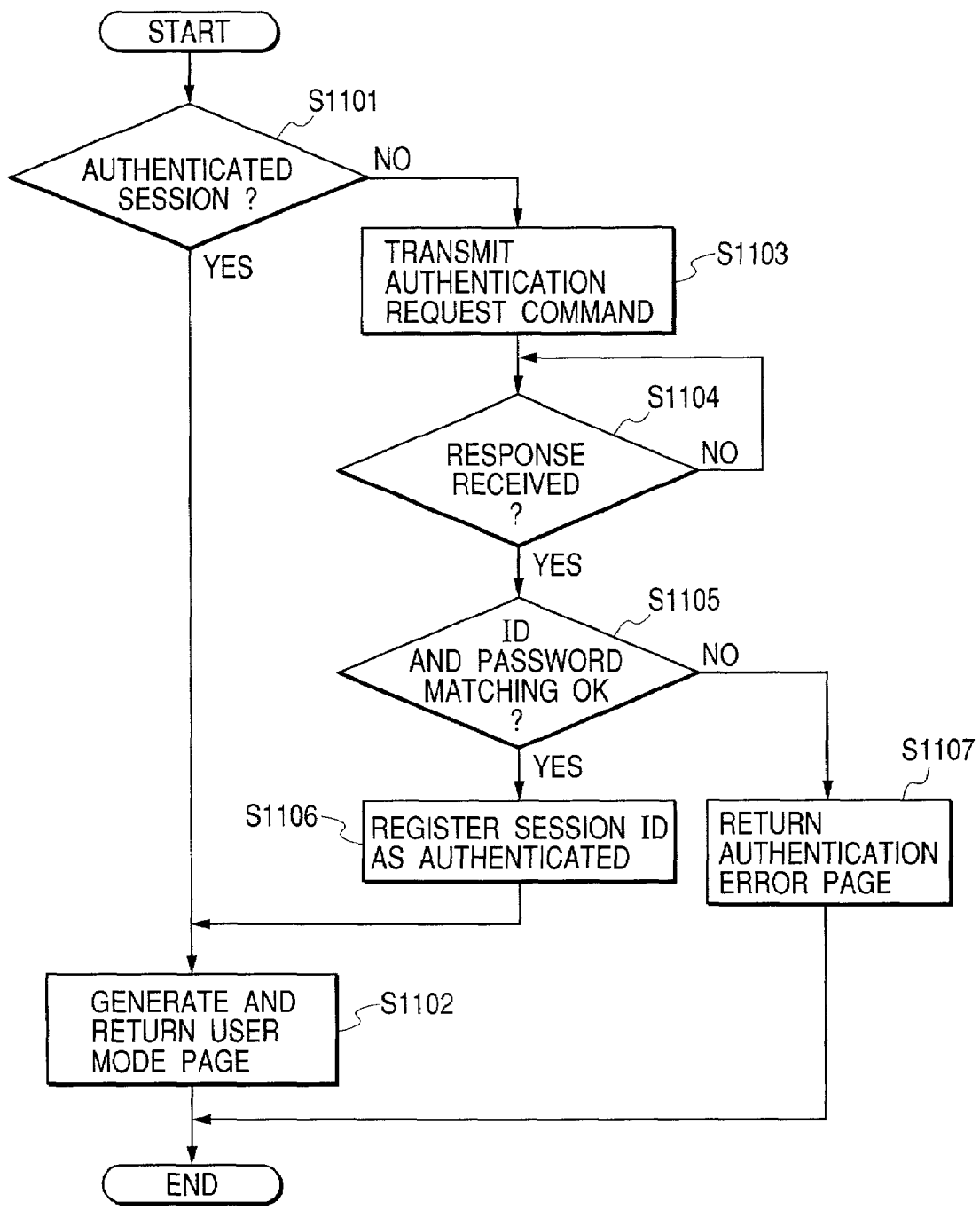
FIG. 11 is a flowchart of the process in the CGI program activated on the Web server part when the user mode button is pressed.

FIG. 11 is a flowchart of the process in the CGI program activated on the Web server when the user mode button 707 is pressed. First, in step S1101, it is determined whether or not the session ID added to the CGI activation request from the Web server has been authenticated. If it has been authenticated, then control is passed to step S1102, and a user mode page is generated and returned, thereby terminating the process.

If it is not authenticated in step S1101, then control is passed to step S1003, and an authentication request command is transmitted to the Web browser. In step S1004, a response to the authentication request command is awaited. Upon receipt of a response in S1004, control is passed to S1005, and it is determined whether or not the transmitted division ID and the password are correct.

As an example of an authenticating process, the division ID and the password set or stored in the image processing device are compared with the division ID and the password transmitted from the Web browser. If they match, it is determined whether or not the authentication has been correctly performed. If the division ID and the password stored in the card inserted into the card reader 2016 of the image processing device are compared with the division ID and the password transmitted from the Web browser, and if they match, then it is determined that the authentication has been correctly successfully performed. Thus, only the operator having the division ID corresponding to the card inserted into the card reader can use the remote UI.

The card to be inserted into the card reader can be other storage media such as an IC card, a card with a non-contact storage medium, etc. Although the image processing device has no card reader device, a user can manually input the ID and the password on the operation panel of the image processing device instead of the authentication using the card reader. Thus, using the input ID and password, the authentication can be performed by the device.

If the authentication is successfully performed, control is passed to step S1106, the corresponding session ID is entered as 'authenticated', and control is passed to step S1102. If it is not successfully performed, then control is passed to step S1107, and an authentication error page is returned to the Web browser, thereby terminating the process.

Figure 13:
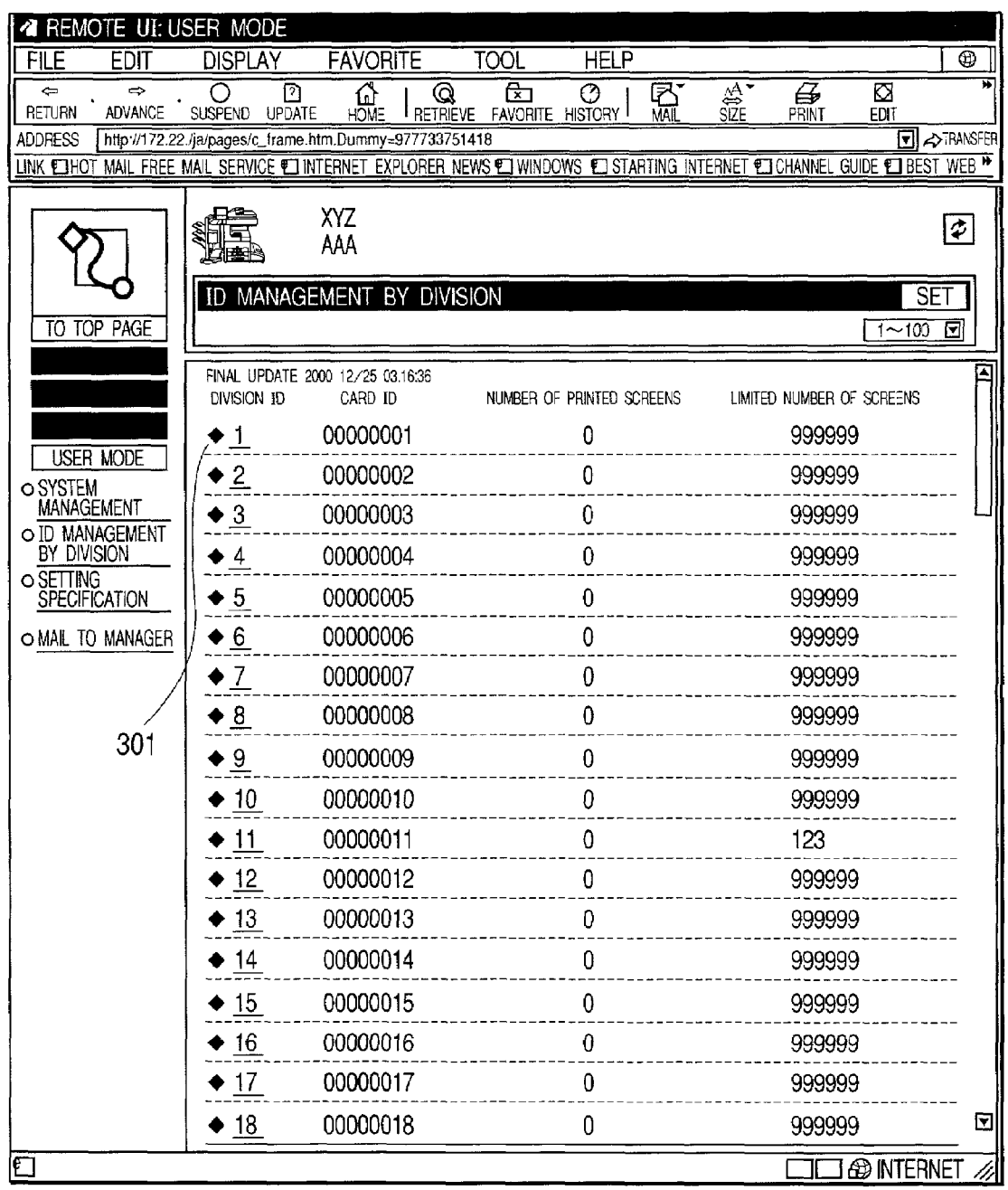
FIG. 13 shows a screen display when a division ID is confirmed through the remote UI.

The entered division ID and password can be viewed and changed from either operation unit of the image processing device or remote UI. FIG. 13 shows an example of a screen display when a division ID is confirmed through the remote UI. The division ID, the card ID, the number of print screens, the limited number of screens are displayed from the leftmost column. The user interface (hereinafter referred to as a Web UI) using the Web is installed in, for example, school and office for use in limiting the number of print pages for each division and in management. A card reader stores an ID (including a manager ID) password for each division. Therefore, a person having a card corresponding to a division ID storing a division ID and a password can operate the setting information of the division of the image processing device. Furthermore, an ID having a privilege as a manager (IT administrator) can similarly be set, and can be managed as one of the division IDs. When a card storing an ID having an IT administrator privilege and a password is input, the setting information about all divisions of the image processing device can be changed.

There are fixed number and fixed value of division IDs and card IDs, and they cannot be changed or deleted. The number of print screens is an accumulation value of the number of print screens (double-sided print output is counted '2') output by an operator of a corresponding division ID. The limited number of screen indicates the number of print screens possibly output by the operator of a corresponding division ID. When the number of print screens exceeds the limited number of screens, the operator of the corresponding division ID cannot continue the printing process. The number of print screens is not limited to this application, but can be a printing frequency, the number of printed sheets of paper, the volume of consumed goods used in printing, etc.

Figure 14:
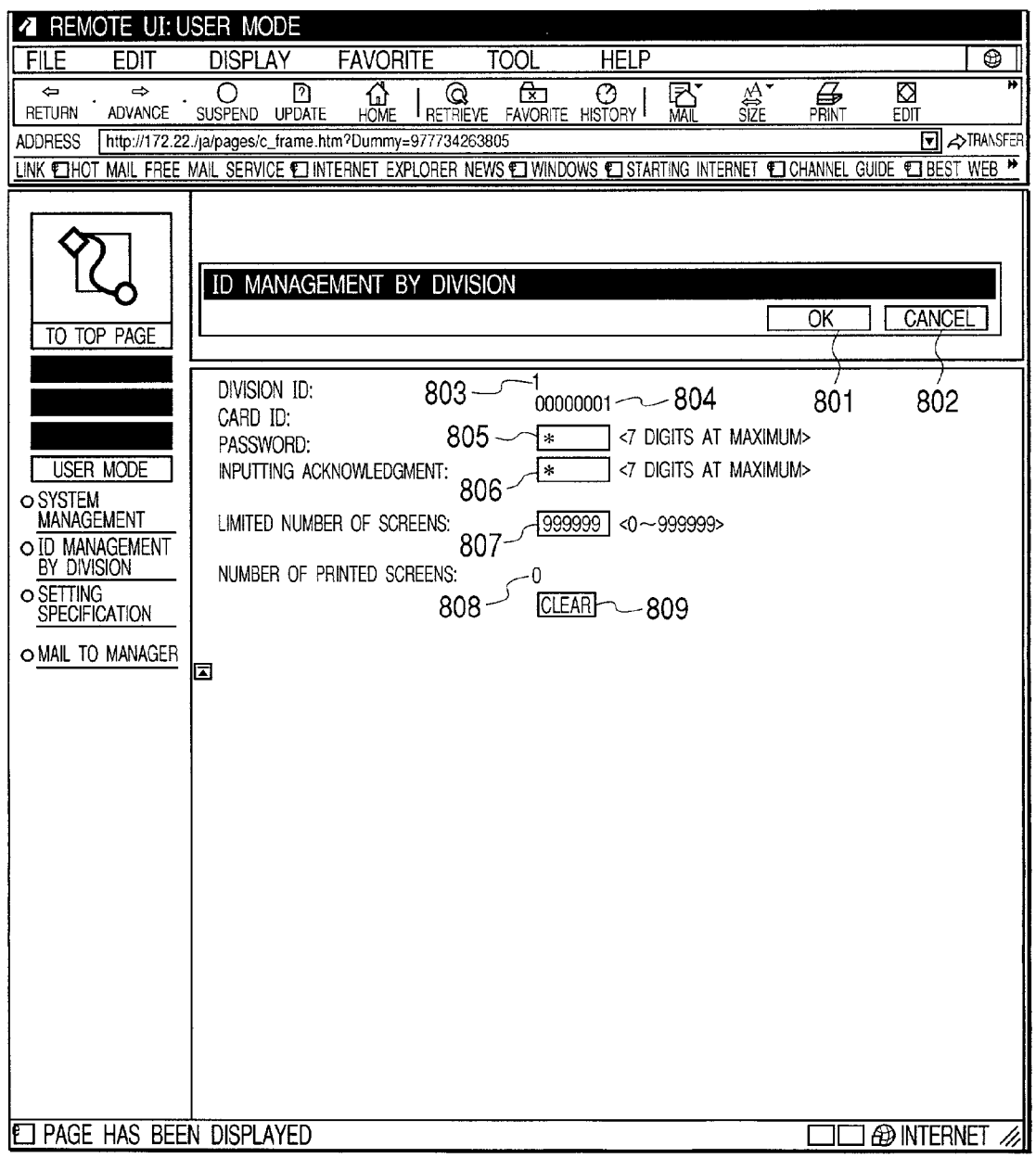
FIG. 14 shows the page for edition of division management.

FIG. 14 is an edition page for division management, and is displayed after the user presses a desired division ID (or the icon on the left of the division ID) in the list of division IDs in FIG. 13. It is obvious that the edition page is used for the division selected from the list of division IDs.

When the user presses an OK button 801, the notice of the contents set on the page is given to the Web server, the backup information about the image processing device is updated, and control is returned to the page for the division ID management shown in FIG. 13.

When the user presses a cancel button 802, the contents set on the page is discarded, thereby returning control to the division ID management page shown in FIG. 13. A display area 803 of a division ID value displays a division ID being edited. A display area 804 of a card ID displays a card ID corresponding to the division ID being edited. Input fields 805 and 806 are used in editing the password of a corresponding division, and input values are echoed back by *. When a user requests to change the password of a corresponding division ID, a new password is input into the input field. To confirm the input value, two input fields 805 and 806 are prepared. An input field 807 is used in setting the limited number of screens of the corresponding division. A display area 808 displays an accumulation value of the number of print screens for the corresponding division. A button 809 is a button for clearing the accumulation value of the number of print screens.

The HTML document forming the page shown in FIG. 13 is returned to the Web browser from the Web server of the image processing device based on the processes shown in FIGS. 10 and 11 when the user selects a predetermined portion in the page. Similarly, the HTML document forming the page shown in FIG. 14 is transmitted from the Web server of the image processing device to the Web browser based on the processes shown in FIGS. 10 and 11 when the user selects the desired division ID from the list of the division IDs shown in FIG. 13.

The authentication is performed using the division ID and the password from the remote UI, and the image processing device performs the authentication using a card reader and a magnetic card. An individual magnetic card stores a code corresponding to the card ID, and the authentication cannot be successfully performed when an unregistered code is detected by the card reader.

Figure 12:
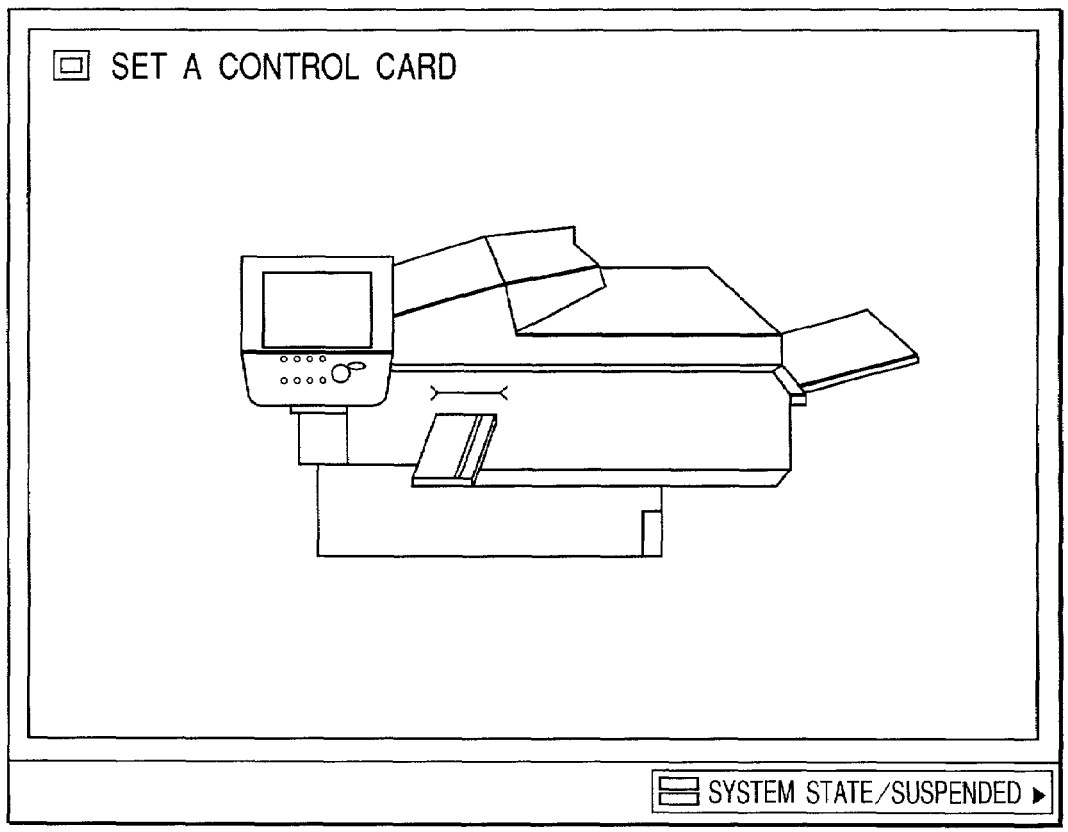
FIG. 12 shows an example of the screen displayed on the operation unit.

If no magnetic cards are inserted into the card reader, the screen shown in FIG. 12 is displayed on the operation unit, and the operation cannot be performed except a part of functions (state display of system, suspending an existing job). In this state, the operations accompanied with print output such as a copying operation are prohibited.

A division ID can be discriminated from an inserted card. In a print output at a copy instruction and a print instruction for a BOX accumulation image from the operation unit, the number of print screens are added for the division corresponding to the inserted card. Furthermore, when a print output is made at a print instruction for the BOX accumulation image in the remote UI, the division is identified by the above mentioned session ID, and is added to the number of print screens of the corresponding division.

Figure 16:
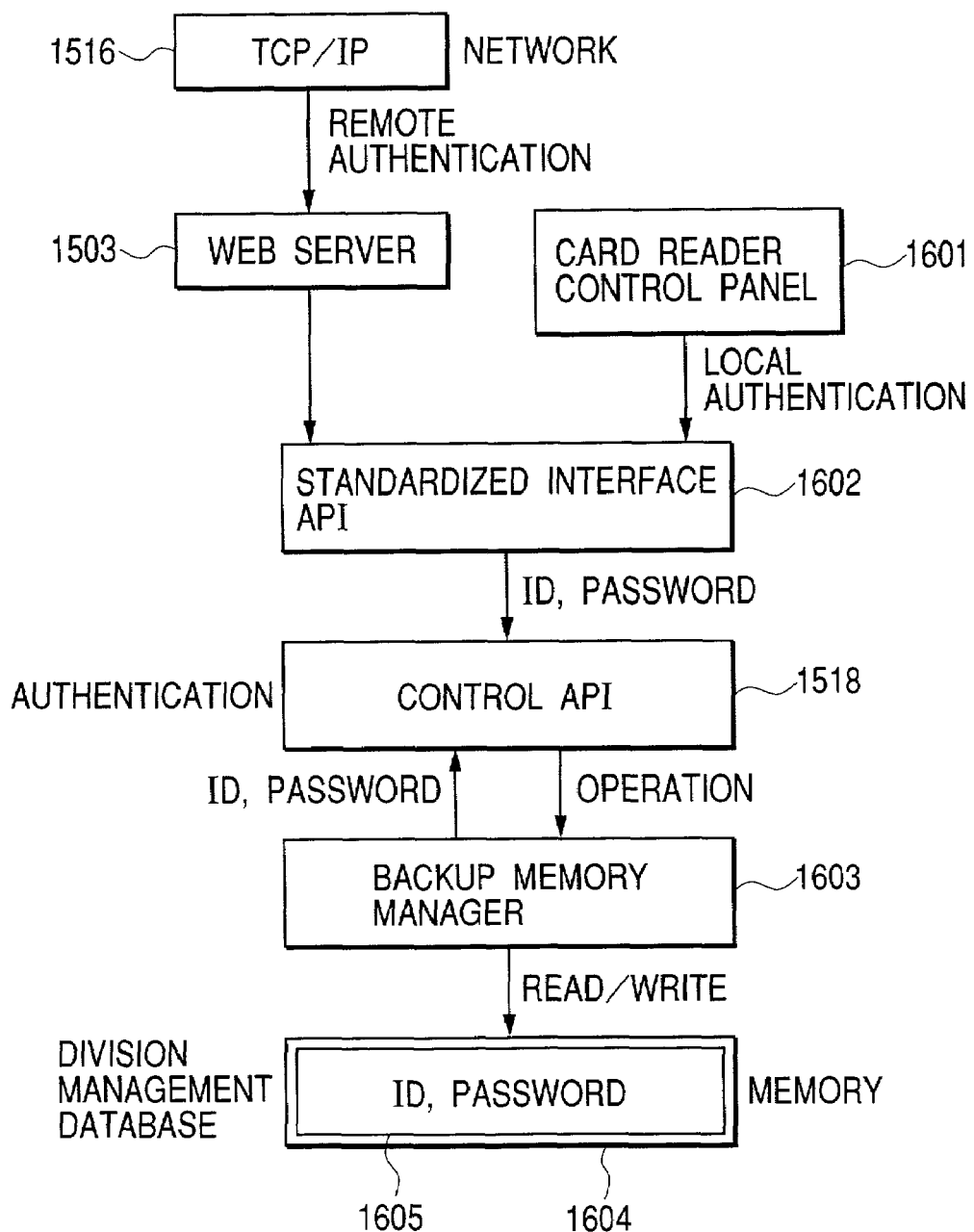
FIG. 16 shows the details of the block diagram shown in FIG. 2.

FIG. 16 shows the detailed block diagram shown in FIG. 2. The units common with the module shown in FIG. 1, for example, the TCP/IP module 1516, the Web-Server module 1503, and the Control-API module 1518 correspond to the descriptions given by referring to FIG. 1. A card reader 1601 corresponds to the card reader 2016 shown in FIG. 3. The Web-Server module 1503 is stored in, for example, the HDD 2004. The TCP/IP module corresponds to, for example, the network 2010 (network 2010), and is connected to the host computer through the LAN which is a network.

The Control-API module 1518 receives remote authentication information from the Web server through a common interface 1602. The Control-API module 1518 receives local authentication information from the card reader or the control panel 1601 through the common interface 1602. FIG. 16 shows the case in which an actual input is made. When an ID, a password, an authentication request instruction, and an operation command to be authenticated are input to the Web-Server module 1503 through the network (TCP/IP 1516), an ID, a password, an authentication request instruction, and an operation to be authenticated are input to the common interface API 1602. The input password, ID, authentication request instruction, and command to be authenticated are converted by the common interface API 1602 into a command interpretable by the Control-API module 1518. Then, the common interface API 1602 inputs the converted ID, password, authentication command, command to be authenticated to the Control-API module 1518.

Then, the Control-API module 1518 operates a backup memory manager 1603 based on the command input from the common interface API 1602. The backup memory manager 1603 reads an ID and password 1605 from the memory in the image processing device (for example, the HDD 2004 shown in FIG. 1), and passes them to the Control-API module 1518.

The Control-API module 1518 determines whether or not the combination of the ID and the password input from the common interface API 1602 matches the combination of the ID and the password read from the memory 1604. If they match, then the Control-API module 1518 is allowed to control the command to be authenticated to be executed. If they do not match, then it is allowed to control the command to be authenticated not to be executed. In this example, the ID, the password, the authentication request command, and the command to be authenticated are simultaneously input into the Web server, but can be separately input at different timings. Thus, the authenticating process based on the input from the Web server and the authenticating process based on the input from the card reader 1601 can be preferably performed on the same authentication information stored in the memory of the image processing device.

As a variation example shown in FIG. 16, it is obvious that the control API can be configured as different authenticating modules as in the authenticating module (authentication processing means) for authentication based on the input of the authentication information from the Web (for example, an ID, a password, a certificate), and the second authenticating module (second authentication input means)

for authentication based on the input of local authentication information from a card reader, an operation panel, etc.

As described above, the image processing device which is a preferred example of the image processing device according to the present invention includes an authenticating process module for performing an authenticating process at a request from the host computer based on a ID and a password added to the request, and a Web server for transmitting from the copying machine to the host computer an HTML page in which the contents of the screen for displaying the information about a copying machine and operating the copying machine are described when a request from the image processing device is accepted based on the authentication result from the authentication processing means. Furthermore, the copying machine includes a second authenticating process module for reading the ID and password of the card inserted into the copying machine, and performing the authenticating process, and the copying machine can be operated in the operation unit when a request from the operation unit of the copying machine is accepted based on the authentication result from the authentication processing means. A request from the host computer to the copying machine includes not only an authentication request but also the information for control of the setting of the copying machine such as clearing the counter information about the copying machine for each division, updating the value of a counter, changing the manager password for each division, adding a new division ID and setting a password, setting an upper limit of printing, etc.

Furthermore, when the local authentication information is input from a card reader or a control panel, the same process as in the case where an ID and a password are input by the Web is performed. For example, when an ID, a password, etc. which are authentication information are input from the card reader 1601, they are input into the common interface API 1602, and converted into a command, etc. interpretable by the Control-API module 1518. Then, the Control-API module 1518 performs the same process as in the case of the process performed using the input from the above mentioned Web UI according to the command and the authentication information.

Figure 17:
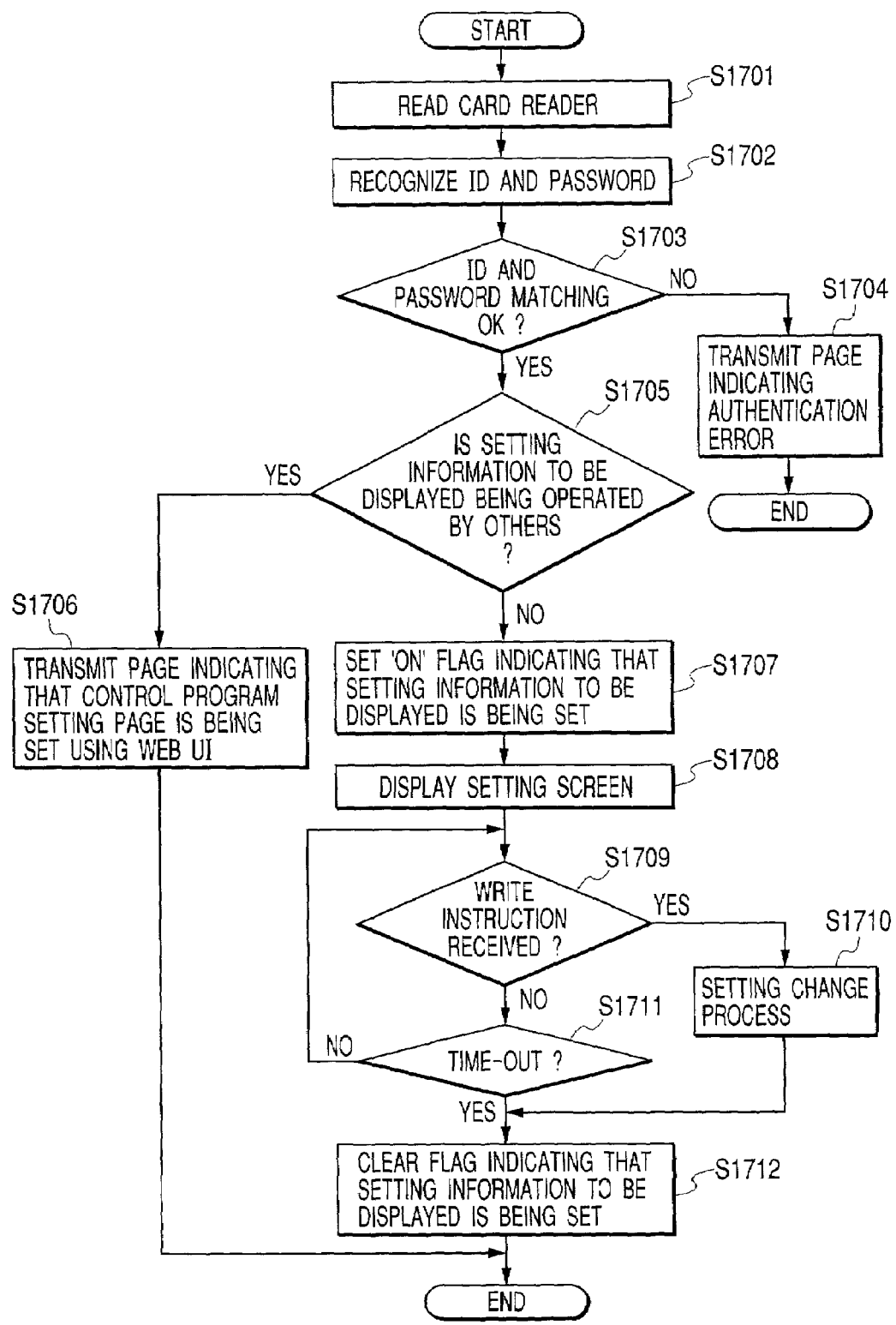
FIG. 17 shows the process in the control API shown in FIG. 16 performed when the authentication is performed from the card reader.

FIG. 17 shows the process in the control API performed when the authentication is performed using a card. When a card storing a division ID and a password is inserted into the card reader provided in the image processing device, and an instruction to display a setting screen of the division corresponding the division ID stored in the card is input from the operation unit, the process is started. In S1701, the control API (control means) reads the card inserted into the card reader. In S1702, the control API recognizes the ID and password stored in the card. In S1703, the control API (determination means) determines whether or not the ID and password obtained from the card reader through the common interface API 1602 match the ID and password 1604 obtained from the memory 1604. If the control API determines in S1703 that the IDs and passwords do not match, then the control API 1602 passes control to S1704, controls the display process of the display such that an authentication error page can be displayed on the operation panel of the image processing device, thereby terminating the process.

If the control API determines in S1703 that the IDs and the passwords match, control is passed to S1705. In S1705, the control API determines whether or not the function of displaying information on the panel is being operated by others. If the control API determines in S1705 that the function information and setting information to be displayed on the panel are being operated by others, then control is passed to S1706, and the control API transmits the page indicating that the information is being set by others in the user interface (hereinafter referred to as Web UI) configured in the Web. If the control API determines in S1705 that the function to be displayed on the panel is not being set by others, then control is passed to S1707, and a flag indicating that it is setting the function displayed on the operation panel is set ON. Thus, when others are to operate the same setting screen from the Web UI, the image processing device can be controlled such that the setting from other Web UI can be suppressed. Then, control is passed to S1708, and the control API controls the process of displaying the setting screen requested by the user on the operation panel (operation unit 2012) of the image processing device.

Then, in S1709, the control API determines whether or not settings have been changed, and a write instruction has been input via the operation panel. If it determines in S1709 that a write instruction has been input, then control is passed to S1710, and the control API changes the setting information corresponding to the division ID stored in the card. For example, on the operation panel, a button for clearing the count information about the number of print in the division ID stored in the card, and a button for changing a password for management of a soft counter and for changing the limited number of screens as an example of displaying the setting information and the function information for operation of the image processing device can be displayed. Furthermore, as the setting information, an input area of a division ID to be newly generated, an area into which the limited-number is input can be displayed. If a manager card having a special ID is inserted, and the password authentication is successfully performed, then the information about all division IDs can be changed or a new division ID can be generated. If the process in S1710 is completed, then the control API clears in S1712 the flag indicating that the function displayed on the operation panel is being set, thereby terminating the process. Then, by inserting another card or performing again an authenticating process on the screen of the Web UI, the setting information including the information about the division management managed by the image processing device can be changed.

On the other hand, if no write instruction is received in S1709, then control is passed to S1711, and the control API determines whether or not a time-out has occurred. If it is determined in S1711 that time-out has not occurred, then control is passed to S1709, and the control API determines again whether or not a write instruction has been input. If it is determined in S1711 that time-out has occurred, then control is passed to S1712, and the control API clears the flag indicating the setting of the control panel, thereby terminating the process and releasing the process of operating the image processing device to other users.

Figure 18:
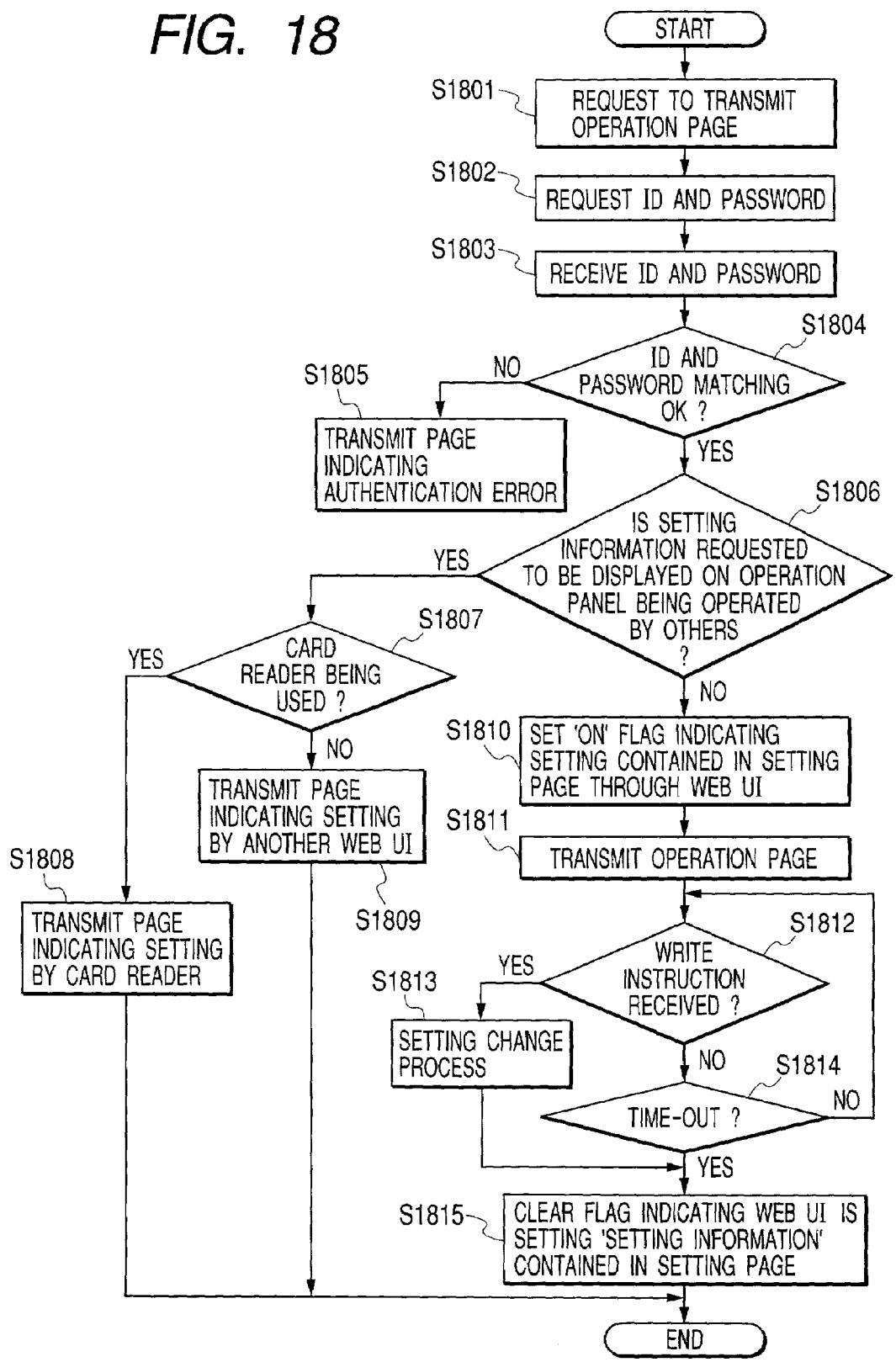
FIG. 18 shows the process in the control API shown in FIG. 16 performed when the authentication is performed from the Web UI.

FIG. 18 shows the process in the control API when authentication is performed from the Web UI.

The flowchart shown in FIG. 18 is started when a request to transmit the page shown in FIG. 14 is issued to the Web-Server module 1503 of the image processing device 200 by a person belonging to, for example, the division having the division ID of 00000001 (hereinafter referred to as division 1) clicking using a mouse, etc. on the portion of the link unit 1 of 1301 shown in FIG. 13 in the host computer 1000.

The details are described below by referring to FIG. 18. In S1801, the control API receives a request for an operation page requiring a right to write of the division 1 (for example, a page shown in FIG. 14). In S1802, the control API requests the host computer for an ID and a password. At this time, the screen shown in FIG. 9 is displayed to the host computer 1000. Then, in S1803, the ID and the password received on the setting screen shown to the host computer in FIG. 9 are input into the control API. Then, control is passed to S1804, and the control API determines whether or not the input ID and password match.

If the control API determines in S1804 that the ID and the password match, then control is passed to S1806. On the other hand, if the control API determines in S1084 that the combination of the ID and the password input from the Web UI does not match the combination of the ID and the password stored in the memory of the image processing device, then the control API controls in S1805 the process of transmitting a page indicating an authentication error to the host computer.

In S1806, the control API determines whether or not the function realized by a setting page corresponding to the ID read from the card is being operated by others. If the control API determines in S1806 that the function realized by the setting page is being operated by others, then control is passed to S1807. In S1807, the control API determines whether or not the setting information contained in the setting page in the card reader is being operated. If it is determined in S1807 that the setting information contained in the setting page on the operation panel is being operated, then control is passed to S1808, and the page displaying that the setting information contained in the setting page on the setting panel (operation unit 2012) is transmitted to the host computer, thereby terminating the process. If it is determined in S1807 that the setting information contained in the setting page cannot be operated on the operation panel, then control is passed to S1809, the display page indicating that the setting page is being operated by Web UI is transmitted, thereby terminating the process.

If it is determined in S1806 that the function contained in the setting page is not being operated by others, then control is passed to S1810, and the flag indicating that the function contained in the setting page is being set by the Web UI is set ON. Then control is passed to S1811, and the operation page corresponding to the division 1 as shown in FIG. 14 is transmitted. The control API enters a write instruction wait state in S1812. A write instruction is transmitted from the host computer to the image processing device by the user instructing to input the OK button 801 on the setting screen displayed on the host computer as shown in FIG. 14 using a mouse which is an input instruction means connected to the host computer. If the control API receives in S1812 a write instruction input from the host computer, the setting information, the function information (for example, a card ID, a division ID, a password, the limited number of screens, etc.) contained in the setting page stored in the memory 1604 in the image processing device are changed, and control is passed to S1815. Then, if the write instruction is not executed for a predetermined time period in S1812, then time-out occurs in S1804, thereby passing control to S1815. In S1815, a flag indicating that the setting information contained in the setting page of the Web UI is being set is cleared, thereby terminating the process.

As described above, the copying machine which is a preferred example of the image processing device according to the present invention comprises a Web server which is a preferable example of the first input means according to the present invention into which an authentication request is input based on the HTTP from the host computer for authentication of the request at the request from the host computer, and a control panel or a card reader control unit which is a preferable example of the second input means according to the present invention for inputting the authentication information input from the operation unit or a card reader of the copying machine. Then, based on an ID and a password input through the Web server or the operation panel or the card reader, etc., and the ID and the password stored in the memory 1604 in the copying machine, the control API which is a preferable example of the authenticating process means is authenticated.

When a request from the host computer is recognized based on the recognition result by the control API, an HTML page which is a preferable example of display information whose contents of the image is described for operation of the copying machine by indicating the information about the copying machine is transmitted by the Web server which is a preferable example of the display information transmission means from the copying machine to the host computer. If the operation of the copying machine or the request from the host computer does not contend with the operation requested by the copying machine and being performed, that is, if the set value and the function information requested when the operation is performed have not changed or read, or if the exclusive control process isn't performed as being used for the set value, then it is preferable if the copying machine can accept the operation in the operation unit of the copying machine or the request from the host computer based on the authentication result of the control API.

The control API can be divided into the first authentication module and the second authentication module. The copying machine is provided with the first authenticating process module for performing the authenticating process based on the ID and the password added to the request at the request from the host computer. If the request from the host computer is recognized based on the authentication result of the first authenticating process module, then the Web server which is a preferable example of a display information transmitting means for transmitting from the copying machine to the host computer transmits the page described in the HTML which is a preferable example of the display information whose contents of the screen are described for the operation of the copying machine by indicating the information about the copying machine. If the request from the operation unit of the copying machine is recognized based on the authentication result by the second authenticating process module, the copying machine becomes operable in the operation unit of the copying machine. The first authenticating process module can be controlled such that the request of operating the copying machine from the host computer cannot be accepted while the request from the operation unit of the copying machine is recognized based on the authentication result by the second authenticating process module for performing the authenticating process according to the authentication information input from the operation unit of the copying machine. Furthermore, the request from the operating unit of the copying machine for operating the copying machine can be controlled not to be accepted while the request input from the host computer using the HTTP is recognized based on the authentication result by the first authenticating process means.

The present invention can be applied to the system configured by plural pieces of equipment (for example, a host computer, interface equipment, a scanner, a printer, etc.), or to a device comprising one piece of equipment (for example, a copying machine, a facsimile device, etc.).

Especially, the image forming device (or the image processing device) is not limited to the device shown in FIGS. 3 and 4, but can be the laser beam printer or the ink jet printer described below.

Figure 15:
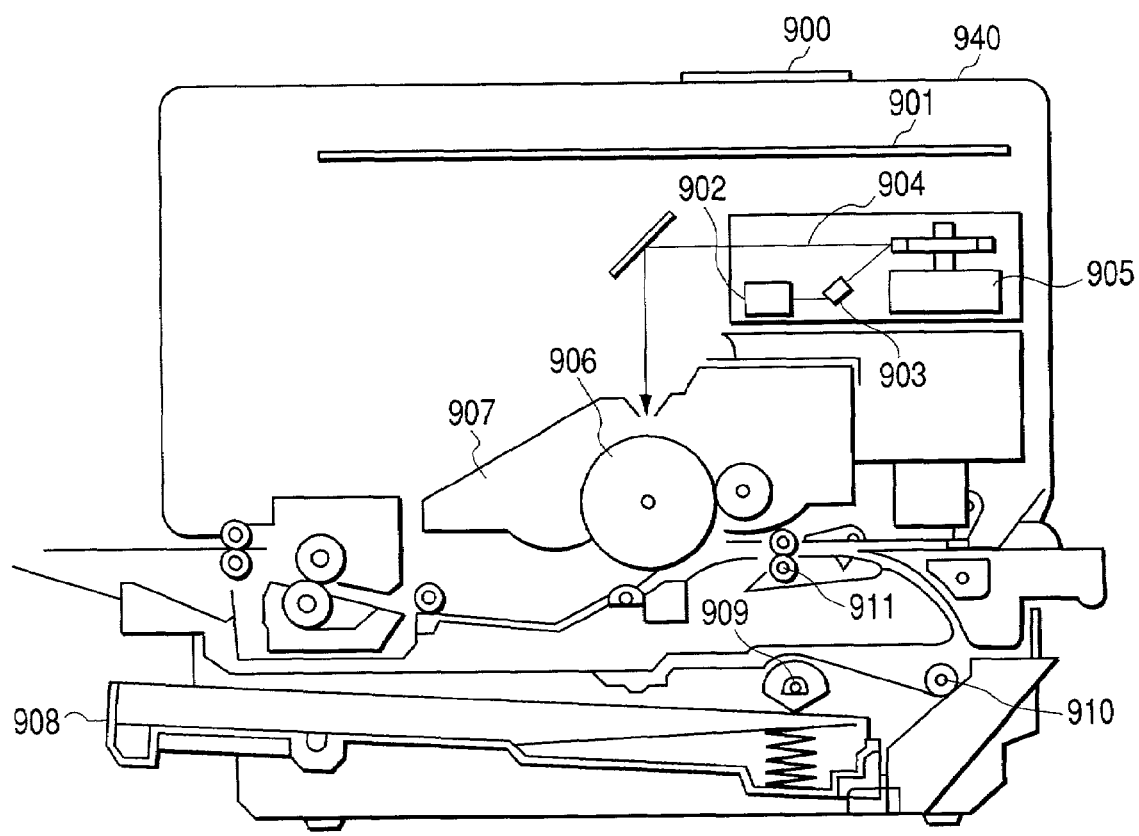
FIG. 15 is a sectional view showing the internal structure of a laser beam printer.

FIG. 15 is a sectional view of the internal structure of the laser beam printer in the above mentioned case, and the LBP can print on recording paper by inputting character pattern data, etc.

In FIG. 15, a body 940 forms an image on the recording paper which is a storage medium based on the provided character pattern, etc. An operation panel 900 is a preferred example of an operation unit according to the present invention comprising a switch for operation, an LED display unit, etc. A printer control unit 901 controls the entire body 940 and analyzes the character pattern information, etc. The printer control unit 901 mainly converts the character pattern information into a video signal, and outputs the signal to a laser driver 902.

The laser driver 902 is a circuit for driving a semiconductor laser 903, and switching on and off a laser beam 904 emitted by the semiconductor laser 903 according to an input video signal. The laser beam 904 scans an electrostatic drum 906 by the scattering effect of a rotatable polygon mirror 905. Thus, an electrostatic latent image of a character pattern is formed on the electrostatic drum 906.

The latent image is developed by a development unit 907 around the electrostatic drum 906, and then transferred on the recording paper. A cut sheet is used as the recording paper, and the cut sheet recording paper is stored in a plurality of paper cassettes 908 corresponding to plural types of paper set in the body 940, supplied to the device through a paper feed roller 909 and transfer rollers 910 and 911, and then provided for the electrostatic drum 906.

The present invention aims at providing a storage medium (or a recording medium) recording a program code of software (for example, the program codes as shown in FIGS. 2, 8, 10, and 11) for realizing the function of the above mentioned embodiment for a system or a device, and a computer (or the CPU or MPU) of the system or the device realizing the function of the above mentioned embodiments by the program code stored in the storage medium. The storage medium and the program code storing the program code itself can configure the present invention.

By executing the program code read by the computer, the above mentioned embodiments can be realized, a part or all of the actual process is performed by the operating system (OS) operated in the computer at an instruction of the program code, and the function according to the above mentioned embodiments can also be realized in the process.

Furthermore, it is obvious that the function according to the above mentioned embodiments can also be realized in the process of writing a program code read from a storage medium to the memory provide for a function extension card inserted into a computer and a function extension unit connected to a computer, and then performing a part or all of the actual process by the CPU in the function extension card and a function extension unit at an instruction of the program code.

As described above, an operation is limited and print output is counted using a division ID (division code) identifying a group, but they can be performed using a user ID identifying a person. In this case, a user can be authenticated by the image processing device according to living information such as fingerprint, voice print, etc.

Thus, according to one of the aspects of the present invention, a division identifier and a password are transmitted from the Web browser to perform an authenticating process by an image output device, thereby determining whether or not a remote operation is to be performed, managing the count of image output by a remote operation, and continuously incorporating the determination as to whether or not an operation of the image output device can be performed using a card into the count of image output. Especially, by authenticating a division using a card reader in the image processing device, an authenticating process can be performed using a division ID and a password corresponding to an individual card when a remote operation is performed when an operation is limited and print output is counted using the HTTP when an operation is limited and print output is counted, thereby providing an authenticating method continuously and using operation means.

Furthermore, according to one of the aspects of the present invention, when one of the local user interface and the remote user interface is being operated, the operation of the other is limited to avoid the inconsistency in the settings when the image processing device is operated.

What is claimed is:

1. An image processing device which can be connected to an information processing device, said image processing device comprising:

first authentication processing means for performing, in response to a request from the information processing device, an authenticating process according to authentication information from the information processing device for authenticating the request;

first discrimination means for discriminating whether an operation unit of said image processing device performs part of a setting operation that, when completed, results in the setting of a function performed by said image processing device;

display information transmission means for transmitting, from said image processing device to the information processing device, display information describing screen contents for operating the image processing device by presenting information about said image processing device when a request from the information processing device is recognized based on an authentication result by said authentication processing means and based on a discrimination result by said first discrimination means;

second authentication processing means for performing an authenticating process by reading authentication information about a card inserted into said image processing device;

second discrimination means for discriminating whether said information processing device performs part of a setting operation that, when completed, results in the setting of the function performed by the image processing device; and means for preventing said image processing device from completing the setting of the function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein when a request from the operation unit of said image processing device is recognized based on the authentication result by said second authentication processing means and based on a result by said second discrimination means, said image processing device becomes operable by the operation unit, wherein the function discriminated by said first and second discriminating means is different than said authenticating processes performed by said first and second authentication processing means.

2. The image processing device according to claim 1, wherein said first authentication processing means and said second authentication processing means perform an authenticating process on the same authentication information as authentication information set in said image processing device.

3. The image processing device according to claim 1, further comprising:
   identification information transmission means for issuing identification information to the information processing device when a request from the information processing device is recognized based on an authentication result by said first authentication processing means, and transmitting the identification information from said image processing device to the information processing device; and
   determination means for determining, in response to a request from the information processing device whether or not the identification information transmitted by said identification information transmission means is added to the request,
   wherein, when said determination means determines that the identification information is added, said display information transmission means transmits the display information without an authenticating process by said first authentication processing means.

4. The image processing device according to claim 1, wherein the display information is described in an HTML document, and
   the request from the information processing device and the display information are transmitted and received according to an HTTP protocol.

5. An image processing device according to claim 1, wherein the setting of the function of the image processing device discriminated by said first and second discrimination means comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

6. An image processing device which can be connected to an information processing device, said image processing device comprising:
   first authentication input means for inputting, in response to a request from the information processing device, authentication information from the information processing device for authenticating the request;
   second authentication input means for inputting authentication information input from an operation unit of said image processing device or a card reader;
   authentication processing means for performing an authenticating process according to authentication information input by said first authentication input means or said second authentication input means, and authentication information in said image processing device;
   discrimination means for discriminating whether the operation unit of said image processing device performs part of a setting operation that, when completed, results in the setting of a function of said image processing device;
   display information transmission means for transmitting, from said image processing device to the information processing device, display information describing screen contents for operating the image processing device by presenting information about said image processing device when a request from the information processing device is recognized based on an authentication result by said authentication processing means and based on a discrimination result by said discrimination means; and
   means for preventing said image processing device from completing the setting of the function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of said image processing device,
   wherein, when the authentication information input by said first or second authentication input means is authenticated by said authentication processing means and said image processing device determines that the function of said image processing device is being set in said image processing device, the operation in the operation unit or the request from the information processing device is accepted based on the authentication result by said authentication processing means,
   wherein the function is different than said authenticating processes performed by said authentication processing means.

7. The image processing device according to claim 6, further comprising:
   conversion means for converting a request for authentication input by said first authentication input means and a request for authentication input by said first second authentication input means into a format interpretable by said authentication processing means.

8. An image processing device according to claim 6, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

9. An image processing device which can be connected to an information processing device, said image processing device comprising:
   first authentication processing means for performing, in response to a request from the information processing device, an authenticating process according to authentication information from the information processing device for authenticating the request;
   display information transmission means for transmitting, from said image processing device to the information processing device, display information describing screen contents for operating the image processing device by presenting information about said image processing device when a request from the information processing device is recognized based on an authentication result by said authentication processing means;
   second authentication processing means for performing an authenticating process according to authentication information input by an operation unit of said image processing device or a card reader; and means for preventing said image processing device from completing the setting of a function performed by said image processing device when at the same time, the information processing device performs part of a setting operation for setting the function of the image processing device, and for preventing the information processing device from completing the setting of the function performed by said image processing device when at the same time, said image processing device performs part of a setting operation for setting the function of the image processing device, wherein when a request from the operation unit to set the function of said image processing device is accepted based on an authentication result by said second authentication processing means, a request to operate the image processing device from the information processing device is not accepted, wherein the function of said image processing device requested to be set by the operation unit is different than said authenticating processes performed by said first and second authentication processing means, wherein the request to operate the image processing device from the information processing device relates to a function different than said authentication processes performed by said first and second authentication processing means.

10. An image processing device according to claim 9, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

11. An image processing device which can be connected to an information processing device, said device comprising:

first authentication processing means for performing, in response to a request from the information processing device, an authenticating process according to authentication information from the information processing device for authenticating the request;

display information transmission means for transmitting, from said image processing device to the information processing device, display information describing screen contents for operating the image processing device by presenting information about said image processing device when a request from the information processing device is recognized based on an authentication result by said authentication processing means;

second authentication processing means for performing an authenticating process by reading authentication information input by an operation unit of said image processing device or a card reader, means for preventing said image processing device from completing the setting of a function performed by said image processing device when at the same time, the information processing device performs part of a setting operation for setting the function of the image processing device, and for preventing the information processing device from completing the setting of the function performed by said image processing device when at the same time, said image processing device performs part of a setting operation for setting the function of the image processing device, wherein when a request to set the function of said image processing device from the information processing device is accepted based on an authentication result by said first authentication processing means, a request to operate said image processing device from the operation unit is not accepted, wherein the function of said image processing device requested to be set from the information processing device and the operation of said image processing device requested to be performed from the operation unit are different than said authenticating processes performed by said first and second authentication processing means.

12. An image processing device according to claim 11, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

13. An information processing method for use by an image processing device which can be connected to an information processing device, said method comprising:

a first authentication processing step, of performing, in response to a request from the information processing device, an authenticating process according to authentication information from the information processing device for authenticating the request;

a first discrimination step for discriminating whether an operation unit of said image processing device performs part of a setting operation that, when completed, results in the setting of a function performed by said image processing device;

a display information transmission step, of transmitting, from the image processing device to the information processing device, display information describing screen contents for operating the image processing device by presenting information about the image processing device when a request from the information processing device is recognized based on an authentication result in said first authentication processing step and based on a discrimination result by said discrimination step;

a second authentication processing step, of performing an authenticating process by reading authentication information about a card inserted into the image processing device;

a second discrimination step for discrimination whether said information processing device performs part of a setting operation that, when completed, results in the setting of the function performed by the image processing and device; and a preventing step of preventing said image processing device from completing the setting of the function performed by said image processing device when at the same time, the information processing device performs part of a setting operation for setting the function of said image processing apparatus, and for preventing the information processing device from completing the setting of the function performed by said image processing device when at the same time, said image processing device performs part of a setting operation for setting the function of the image processing device, wherein when a request from the operation unit of the image processing device is recognized based on an authentication result in said second authentication processing step and based on the discrimination result of said second discrimination step, the image processing device becomes operable by the operation unit, wherein the function is different than said authenticating processes performed by said first and second authentication processing steps.

14. The image processing method according to claim 13, wherein said first authentication processing step and said second authentication processing step include performing an authenticating process on the same authentication information as authentication information set in the image processing device.

15. The image processing method according to claim 13, further comprising:

an identification information transmission step, of issuing identification information to the information processing device when a request from the information processing device is recognized based on an authentication result in said first authentication processing step, and transmitting the identification information from the image processing device to the information processing device; and a determination step, of determining, in response to a request from the information processing device whether or not the identification information transmitted in said identification information transmission step is added to the request, wherein, when said determination step determines that the identification information is added, said display information transmission step transmits the display information without an authenticating process in said first authentication processing step.

16. The image processing method according to claim 13, wherein the display information is described in an HTML document, and the request from the information processing device and the display information are transmitted and received according to an HTTP protocol.

17. An information processing method according to claim 13, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

18. An information processing method for use by an image processing device which can be connected to an information processing device, said method comprising:

a first authentication input step, of inputting, in response to a request from the information processing device, authentication information from the information processing device for authenticating the request;

a second authentication input step, of inputting authentication information input from an operation unit of the image processing device or a card reader;

an authentication processing step, of performing an authenticating process according to authentication information input in said first authentication input step or said second authentication input step, and authentication information in the image processing device;

a discrimination step for discriminating whether the operation unit of said image processing device performs part of a setting operation that, when completed, results in the setting of a function of said image processing device;

a display information transmission step, of transmitting, from the image processing device to the information processing device, display information describing screen contents for operating the information processing device by presenting information about the image processing device when a request from the information processing device is recognized based on an authentication result in said authentication processing step and based on a discrimination result by said discrimination step; and a preventing step of preventing said image processing device from completing the setting of the function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device wherein, when the authentication information input by said first or second authentication input steps is authenticated by said authentication processing step and said image processing device determines that the function of said image processing device is being set in the image processing device, the operation in the operation unit or the request from the information processing device is accepted based on an authentication result in said authentication processing step, wherein the function is different than said authenticating processes performed by said authentication processing step.

19. The image processing method according to claim 18, further comprising a conversion step, of converting a request for authentication input in said first authentication input step and a request for authentication input in said second authentication input step into a format interpretable in said authentication processing step.

20. An information processing method according to claim 18, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

21. An information processing method for use by an image processing device which can be connected to an information processing device, said method comprising:

a first authentication processing step, of performing, in response to a request from the information processing device, an authenticating process according to authentication information from the information processing device for authenticating the request;

a display information transmission step, of transmitting, from the image processing device to the image processing device, display information describing screen contents for operating the image processing device by presenting information about the image processing device when a request from the information processing device is recognized based on an authentication result in said authentication processing step;

a second authentication processing step, of performing an authenticating process according to authentication information input by an operation unit of the image processing device or a card reader; and a preventing step of preventing said image processing device from completing the setting of a function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein, when a request from the operation unit to set the function of said image processing device is accepted based on an authentication result in said second authentication processing step, a request to operate the image processing device from the information processing device is not accepted, wherein the function of said image processing device requested to be set by the operation unit is different than said authenticating processes performed by said first and second authentication processing steps, wherein the request to operate the image processing device from the information processing device relates to a function different than said authentication processes performed by said first and second authentication processing steps.

22. An information processing method according to claim 21, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

23. An information processing method for use by an image processing device which can be connected to an information processing device, said method comprising:

a first authentication processing step, of performing, in response to a request from the information processing device, an authenticating process according to authentication information from the information processing device for authenticating the request;

a display information transmission step, of transmitting, from the image processing device to the information processing device, display information describing screen contents for operating the image processing device by presenting information about the image processing device when a request from the information processing device is recognized based on an authentication result in said first authentication processing step;

a second authentication processing step, of performing an authenticating process by reading authentication information input by an operation unit of the image processing device or a card reader; and a preventing step of preventing said image processing device from completing the setting of a function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein, when a request to set the function of the image processing device from the information processing device is accepted based on an authentication result in said first authentication processing step, a request to operate the image processing device from the operation unit is not accepted, wherein the function of said image processing device requested to be set from the information processing device and the operation of said image processing device requested to be performed from the operation unit are different than said authenticating processes performed by said first and second authentication processing steps.

24. An information processing method according to claim 23, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

25. A computer-readable storage medium storing a control program for controlling an information processing method for use by an image processing device which can be connected to an information processing device, said program comprising:

code for a first authentication processing step, of performing, in response to a request from the information processing device, an authenticating process according to authentication information from the information processing device for authenticating the request;

code for a discrimination step for discriminating whether an operation unit of said image processing device performs part of a setting operation that, when completed, results in the setting of a function of said image processing device;

code for a display information transmission step, of transmitting, from the image processing device to the image processing device, display information describing screen contents for operating the image processing device by presenting information about the image processing device when a request from the information processing device is recognized based on an authentication result in said first authentication processing step and based on a discrimination result by said first discrimination step;

code for a second authentication processing step, of performing an authenticating process by reading authentication information about a card inserted into the image processing device; and code for a second discrimination step for second discrimination means for discriminating whether said information processing device performs part of a setting operation that, when completed, results in the is setting of the function of the image processing device; and code for preventing said image processing device from completing the setting of the function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein, when a request from an operation unit of the image processing device is recognized based on the authentication result in said second authentication processing step and based on the discrimination result of said second discrimination step, the image processing device becomes operable by the operation unit;

wherein the function is different than said authenticating processes performed by said first and second authentication processing steps.

26. A computer-readable storage medium according to claim 25, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

27. A computer-readable storage medium storing a control program for controlling an information processing method for use by an image processing device which can be connected to an information processing device, said program comprising:

code for a first authentication input step, of inputting, in response to a request from the information processing device, authentication information from the information processing device for authenticating the request;

code for a second authentication input step, of inputting authentication information input from an operation unit of the image processing device or a card reader;

code for an authentication processing step, of performing an authenticating process according to authentication information input in said first authentication input step or said second authentication input step, and authentication information in the image processing device;

code for a discrimination step for discriminating whether the operation unit of said image processing device performs part of a setting operation that, when completed, results in the setting of a function of said image processing device;

code for a display information transmission step, of transmitting, from the image processing device to the information processing device, display information describing screen contents for operating the information processing device by presenting information about the image processing device when a request from the information processing device is recognized based on an authentication result in said authentication processing step and based on a discrimination result by said discrimination step; and code for preventing said image processing device from completing the setting of the function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein, when the authentication information input by said first or second authentication input steps is authenticated by said authentication processing step and said image processing device determines that the function of said image processing device is being set in the image processing device, the operation in the operation unit or the request from the information processing device is accepted based on an authentication result in said authentication processing step, wherein the function different than said authenticating processes performed by said authentication processing step.

28. A computer-readable storage medium according to claim 27, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

29. A computer-readable storage medium storing a control program for controlling an information processing method for use by an image processing device which can be connected to an information processing device, program comprising:

code for a first authentication processing step, of performing, in response to a request from the information processing device, an authenticating process according to authentication information from the information processing device for authenticating the request;

code for a display information transmission step, of transmitting, from the image processing device to the information processing device, display information describing screen contents for operating the image processing device by presenting information about the image processing device when a request from the information processing device is recognized based on an authentication result in said authentication processing step;

code for a second authentication processing step, of performing an authenticating process according to authentication information input by an operation unit of the image processing device or a card reader; and code for preventing said image processing device from completing the setting of a function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein, when a request from the operation unit to set the function of said image processing device is accepted based on an authentication result in said second authentication processing step, a request to operate the image processing device from the information processing device is not accepted, wherein the function of said image processing device requested to be set by the operation unit is different than said authenticating processes performed by said first and second authentication processing steps, wherein the request to operate the image processing device from the information processing device relates to a function different than said authentication processes performed by said first and second authentication processing steps.

30. A computer-readable storage medium according to claim 29, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

31. A computer-readable storage medium storing a control program for controlling an information processing method for use by an image processing device which can be connected to an information processing device, said program comprising:

code for a first authentication processing step, of performing, in response to a request from the information processing device, an authenticating process according to authentication information from the information processing device for authenticating the request;

code for a display information transmission step, of transmitting, from the image processing device to the information processing device, display information describing screen contents for operating the image processing device by presenting information about the image processing device when a request from the information processing device is recognized based on an authentication result in said authentication processing step;

code for a second authentication processing step, of performing an authenticating process by reading authentication information input by an operation unit of the image processing device or a card reader; and code for preventing said image processing device from completing the setting of a function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein, when a request to set the function of the image processing device from the information processing device is accepted based on an authentication result in said first authentication processing step, a request to operate the image processing device from the operation unit is not accepted, wherein the function of said image processing device requested to be set from the information processing device and the operation of said image processing device requested to be performed from the operation unit are different than said authenticating processes performed by said first and second authentication processing steps.

32. A computer-readable storage medium according to claim 31, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

33. An image processing device which can be connected to an information processing device, said image processing device comprising:

a first authentication processing unit configured to, in response to a request from the information processing device, authenticate the request in accordance with authentication information from the information processing device;

a first discrimination unit for discriminating whether an operation unit of said image processing device performs part of a setting operation that, when completed, results in the setting of a function of said image processing device;

a display information transmission unit configured to transmit, from said image processing device to the information processing device, display information describing screen contents for operating the image processing device by presenting information about said image processing device when the request from the information processing device is recognized based on an authentication result by said authentication processing unit and based on a discrimination result by said first discrimination unit;

a second authentication processing unit configured to perform an authenticating process by reading authentication information about a card inserted into said image processing device;

a second discrimination unit for discriminating whether said information processing device performs part of a setting operation that, when completed, results in the setting of the function of the image processing device; and means for preventing said image processing device from completing the setting of the function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein, when a request from the operation unit of said image processing device is recognized based on the authentication result by said second authentication processing unit and based on a result by said second discrimination unit, said image processing device becomes operable by the operation unit, wherein the function is different than said authenticating processes performed by said first and second authentication processing units.

34. The image processing device according to claim 33, wherein said first authentication processing unit and said second authentication processing unit perform an authenticating process on the same authentication information as authentication information set in said image processing device.

35. The image processing device according to claim 33, further comprising:

an identification information transmission unit configured to issue identification information to the information processing device when a request from the information processing device is recognized based on an authentication result by said first authentication processing unit, and transmit the identification information from said image processing device to the information processing device; and a determination unit configured to determine, in response to a request from the information processing device whether or not the identification information transmitted by said identification information transmission unit is added to the request, wherein, when said determination unit determines that the identification information is added, said display information transmission unit transmits the display information without an authenticating process by said first authentication processing unit.

36. The image processing device according to claim 33, wherein the display information is described in an HTML document, and the request from the information processing device and the display information are transmitted and received according to an HTTP protocol.

37. An image processing device according to claim 33, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

38. An image processing device which can be connected to an information processing device, said image processing device comprising:

a first authentication unit configured to input, in response to a request from the information processing device, authentication information from the information processing device for authenticating the request;

a second authentication unit configured to input authentication information input from an operation unit of the image processing device or a card reader;

an authentication processing unit configured to perform an authenticating process according to authentication information input by said first authentication input unit or said second authentication input unit, and authentication information in said image processing device;

a discrimination unit for discriminating whether the operation unit of said image processing device performs part of a setting operation that, when completed, results in the setting a function of said image processing device;

a display information transmission unit configured to transmit, from said image processing device to the information processing device, display information describing screen contents for operating the image processing device by presenting information about said image processing device when a request from the information processing device is recognized based on an authentication result by said authentication processing unit and based on a discrimination result by said discrimination means; and means for preventing said image processing device from completing the setting of the function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein when the authentication information input by said first or second authentication input unit is authenticated by said authentication processing unit and said image processing device determines that the function of said image processing device is being set in said image processing device, the operation in the operation unit or the request from the information processing device is accepted based on the authentication result by said authentication processing unit, wherein the function is are different than said authenticating processes performed by said authentication processing unit.

39. The image processing device according to claim 38, further comprising:

a conversion unit configured to convert a request for authentication input by said first authentication input unit and a request for authentication input by said second authentication input unit into a format interpretable by said first authentication processing unit.

40. An image processing device according to claim 38, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

41. An image processing device which can be connected to an information processing device, said image processing device comprising:

an authentication processing unit configured to, in response to a request from the information processing device, authenticate the request in accordance with authentication information from the information processing device;

a display information transmission unit configured to transmit, from said image processing device to the information processing device, display information describing screen contents for operating the image processing device by presenting information about said image processing device when a request from the information processing device is recognized based on an authentication result by said authentication processing unit;

a second authentication processing unit configured to perform an authenticating process according to authentication information input by an operation unit of said image processing device or a card reader; and means for preventing said image processing device from completing the setting of a function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein when a request from the operation unit to set the function of said image processing device is accepted based on an authentication result by said second authentication processing unit, a request to operate the image processing device from the information processing device is not accepted, wherein the function of said image processing device requested to be set by the operation unit is different than said authenticating processes performed by said first and second authentication processing units, wherein the request to operate the image processing device from the information processing device relates to a function different than said authentication processes performed by said first and second authentication processing units.

42. An image processing device according to claim 41, wherein the setting of the function of the image processing apparatus comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

43. An image processing device which can be connected to an information processing device, said device comprising:
- a first authentication processing unit configured to, in response to a request from the information processing device, authenticate the request in accordance with authentication information from the information processing device;
- a display information transmission unit configured to transmit, from said image processing device to the information processing device, display information describing screen contents for operating the image processing device by presenting information about said image processing device when a request from the information processing device is recognized based on an authentication result by said authentication processing unit;
- a second authentication processing unit configured to perform an authenticating process by reading authentication information input by an operation unit of said image processing device or a card reader; and
- means for preventing said image processing device from completing the setting of a function performed by said image processing device when at the same time, the information processing device performs part of a setting operation for setting the function of said image processing device, and for preventing the information processing device from completing the setting of the function performed by said image processing device when at the same time, said image processing device performs part of a setting operation for setting the function of the image processing device, wherein when a request to set a the function of said image processing device from the information processing device is accepted based on an authentication result by said first authentication processing unit, a request to operate said image processing device from the operation unit is not accepted, wherein the function of said image processing device requested to be set from the information processing device and the operation of said image processing device requested to be performed from the operation unit are different than said authenticating processes performed by said first and second authentication processing units.

44. An image processing device according to claim 43, wherein the setting of the function of the image processing device comprises one of: setting the paper size, setting the remaining volume, setting the input job, setting the document information stored in the storage device, setting address information, setting network information, clearing counter information, updating the value of a counter, changing a manager password, adding a new division ID, setting a password, setting a copying upper limit, and setting an ID.

* * * * *

UNITED STATES PATENT AND TRADEMARK OFFICE
CERTIFICATE OF CORRECTION

| | |
|---|---|
| PATENT NO. | : 7,327,478 B2 |
| APPLICATION NO. | : 10/084421 |
| DATED | : February 5, 2008 |
| INVENTOR(S) | : Hiroshi Matsuda |

It is certified that error appears in the above-identified patent and that said Letters Patent is hereby corrected as shown below:

COLUMN 1

Line 34, "system" should read --systems--.

COLUMN 3

Line 64, "an" should read --a--.

COLUMN 7

Line 2, "stage" should read --stages--.

COLUMN 8

Line 15, "corresponding" should read --corresponding to--.

COLUMN 11

Line 9, "screen" should read --screens--.

COLUMN 14

Line 30, "limited-number" should read --limited number--.

COLUMN 17

Line 49, "provide" should read --provided--.

COLUMN 20

Line 36, "first" should be deleted; and
Line 41, "apparatus" should read --device--.

COLUMN 21

Line 29, "apparatus" should read --device--.

UNITED STATES PATENT AND TRADEMARK OFFICE
CERTIFICATE OF CORRECTION

| | | |
|---|---|---|
| PATENT NO. | : 7,327,478 B2 | |
| APPLICATION NO. | : 10/084421 | |
| DATED | : February 5, 2008 | |
| INVENTOR(S) | : Hiroshi Matsuda | |

It is certified that error appears in the above-identified patent and that said Letters Patent is hereby corrected as shown below:

COLUMN 22

Line 14, "apparatus" should read --device--; and
Line 58, "apparatus," should read --device,--.

COLUMN 23

Line 42, "apparatus" should read --device--.

COLUMN 24

Line 24, "device" should read --device,--; and
Line 45, "apparatus" should read --device--.

COLUMN 25

Line 35, "apparatus" should read --device--.

COLUMN 26

Line 22, "apparatus" should read --device--.

COLUMN 27

Line 19, "apparatus" should read --device--.

COLUMN 28

Line 12, "different" should read --is different--;
Line 17, "apparatus" should read --device--; and
Line 28, "program" should read --said program--.

COLUMN 29

Line 10, "apparatus" should read --device--; and
Line 67, "apparatus" should read --device--.

UNITED STATES PATENT AND TRADEMARK OFFICE
CERTIFICATE OF CORRECTION

PATENT NO. : 7,327,478 B2
APPLICATION NO. : 10/084421
DATED : February 5, 2008
INVENTOR(S) : Hiroshi Matsuda It is certified that error appears in the above-identified patent and that said Letters Patent is hereby corrected as shown below:

COLUMN 31

Line 27, "apparatus" should read --device--; and
Line 52, "setting" should read --setting of--.

COLUMN 32

Line 17, "are" should be deleted; and
Line 29, "apparatus" should read --device--.

COLUMN 33

Line 18, "apparatus" should read --device--.

COLUMN 34

Line 16, "a the" should read --the--.

Signed and Sealed this

Twenty-third Day of September, 2008

JON W. DUDAS
*Director of the United States Patent and Trademark Office*